(12) United States Patent
Dammann

(10) Patent No.: US 8,249,346 B2
(45) Date of Patent: Aug. 21, 2012

(54) THREE DIMENSIONAL IMAGING METHOD AND APPARATUS

(75) Inventor: John F. Dammann, Chevy Chase, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 776 days.

(21) Appl. No.: 12/360,757

(22) Filed: Jan. 27, 2009

(65) Prior Publication Data

US 2010/0020066 A1 Jan. 28, 2010

Related U.S. Application Data

(60) Provisional application No. 61/023,961, filed on Jan. 28, 2008.

(51) Int. Cl.
*G06K 9/34* (2006.01)
(52) U.S. Cl. ........ 382/173; 382/171; 382/164; 382/285; 382/260; 382/232
(58) Field of Classification Search .................. 382/173, 382/171, 164, 285, 260, 261, 262, 263, 264, 382/232; 348/578, 580; 345/419, 427
See application file for complete search history.

(56) References Cited

U.S. PATENT DOCUMENTS

| | | | | |
|---|---|---|---|---|
| 5,563,963 | A * | 10/1996 | Kaplan et al. | 382/266 |
| 5,875,249 | A * | 2/1999 | Mintzer et al. | 380/54 |
| 7,792,331 | B2 * | 9/2010 | Balaga et al. | 382/113 |
| 2007/0120848 | A1 * | 5/2007 | Kondo et al. | 345/419 |

OTHER PUBLICATIONS

B.L. Stann, et al., "Intensity-modulated diode laser radar using frequency-modulation/continuous-wave ranging techniques," Optical Engineering, vol. 35, No. 11, 1996, pp. 3270-3278.
B.L. Stann in "Research Progress on a Focal Plane Array Leder System Using Chirped Amplitude Modulation," Proc. SPIE Laser Radar Technology and Applications VIII, vol. 5086, 2003.
"3DEM Software for Terrain Visualization and Flyby Animation," found at the website http://www.visualizationsoftware.com/software.arcgis/explorer/index.html, webpages dated Dec. 5, 2006.
"ArcGIS Explorer," mapping software, disclosed at Http://www.esri.com/softwar-e/arcgis/explorer/index.html, copyright on Microsoft. NET Framework 2.0 Service Pack 1 (x86) Nov. 19, 2007.

(Continued)

*Primary Examiner* — Ali Bayat
(74) *Attorney, Agent, or Firm* — Lawrence E. Anderson

(57) ABSTRACT

Three-dimensional imaging techniques are used for a visualization method and apparatus. In a preferred embodiment, terrain data is displayed as a series of pixels—areas of terrain elevation data. Individual pixels are analyzed to determine whether they are locally smooth or "warpable" relative to their surrounding neighbor pixels. Those pixels that are locally relatively "smooth," i.e., those satisfying a given set of criteria, are joined with adjacent neighbor pixels by a process referred to herein as "warping" to create "smooth," gap-free surfaces. A preferred embodiment includes drawing or generating lines between the centers of two pairs of adjacent pixels to determine a slopes $m_1$ and $m_2$ respectively. The slopes $m_1$ and $m_2$ are then analyzed using the following equations/determinations: $|m_1| \leq m_{max}$; $|m_2| \leq m_{max}$; and $|m_1 - m_2| \leq \Delta max$; i.e., the slopes $m_1$ and $m_2$ must each be less than or equal to a predetermined threshold $m_{max}$ and the difference between the slopes must be less than or equal to a predetermined difference $\Delta max$.

19 Claims, 23 Drawing Sheets
(11 of 23 Drawing Sheet(s) Filed in Color)

OTHER PUBLICATIONS

"Using Google Earth to Visit the World" File Format: PDF/Adobe Acrobat -located on Internet at . . . www.texarkanacollege.edu/~ctownley/Cisco/CiscoLabs/1.1.1.1.pdf. copyright 2007.

Perez, J. "Google Earth gets overlay search feature,"Published on InfoWorld (http://www.infoworld.com), Feb. 14, 2007.

3DEM Software for Terrain Visualization and Flyby Animation, http://www.visualizationsoftware.com/3dem.html, Jan. 2005; http://web.archive.org/web/200501-200402re_/http://www.visualizationsoftware.com/3dem.html.

* cited by examiner

Fig. 1 - CONVENTIONAL CONTINOUS SURFACE IMAGING

Fig. 2 – "POINT-CLOUD" APPROACH

Fig. 16- *IMAGE BEFORE TEXTURE-BASE SEGMENTATION ALGORITHM* – Transition from overhead image to 3-D image results in pixels at different elevations; such that gaps appear.

Fig. 17 - IMAGE AFTER TEXTURE-BASE SEGMENTATION ALGORITHM – Gaps removed from pixels at slightly different elevations.

THREE DIMENSIONAL IMAGING METHOD AND APPARATUS

RELATED APPLICATIONS

This application is a utility application claiming priority of U.S. Provisional Application Ser. No. 61/023,961 filed Jan. 28, 2008, entitled "A Novel Technique for Visualizing High-Resolution 3-D Terrain Maps," which is incorporated herein by reference.

GOVERNMENT INTEREST

The invention described herein may be manufactured, used, and licensed by or for the United States Government.

REFERENCE TO PARTIAL COMPUTER PROGRAM LISTING

Appendix A contains a partial computer program listing adapted for a preferred embodiment of the present invention.

FIELD OF THE INVENTION

This invention relates to digital terrain elevation techniques and/or three dimensional imaging techniques involving scenes, landscapes, ground areas, environmental surroundings (indoors and outdoors), and the like.

BACKGROUND OF THE INVENTION

With the arrival of GPS in the 1980's, GPS based surveying technology has made airborne surveying and mapping applications practical. Many have been developed, using downward-looking lidar instruments mounted in aircraft or satellites. Lidar (Light Detection and Ranging) is an optical remote sensing technology that uses laser pulses to determine the distance to a target and/or gather other information from a target. The distance to an object or target is measured using the time between the transmission of the initial pulse and receipt of the reflected signal. As used herein, the term Lidar or LIDAR includes ALSM (Airborne Laser Swath Mapping), laser altimetry, and LADAR (Laser Detection and Ranging), Lidar differs from radar in that lidar utilizes much shorter wavelengths of the electromagnetic spectrum are used, typically in the ultraviolet, visible, or near infrared. An example of lidar usage is the NASA Experimental Advanced Research Lidar. In general, it is possible to image a feature or object only about the same size as the wavelength, or larger. The wavelengths are much smaller than radio (radar) systems, and range from about 10 micrometers to the UV (ca. 250 nm). At such wavelengths, the waves are "reflected" very well from small objects, referred to as backscattering. Different types of scattering are used for different lidar applications; most common are Rayleigh scattering, Mie scattering and Raman scattering as well as fluorescence.

A laser typically has a very narrow beam which allows the mapping of physical features with very high resolution compared with radar. Suitable combinations of lasers can allow for remote mapping of atmospheric contents by looking for wavelength-dependent changes in the intensity of the returned signal.

For example, B. L. Stann, et al., "Intensity-modulated diode laser radar using frequency-modulation/continuous-wave ranging techniques," Optical Engineering, Vol. 35, No. 11, 1996, pp. 3270-3278, discloses an adaptation of frequency modulation (FM) radar ranging principles to an incoherent laser radar (LADAR). The LADAR's laser transmitter output is amplitude-modulated with a radio-frequency subcarrier, which itself is linearly frequency-modulated. The subcarrier signal may have a start frequency in the tens to low hundreds of megahertz and a stop frequency in the hundreds of megahertz to low gigahertz. The difference between the start and stop frequency, F, is chosen to establish the desired range resolution R using, inter alia, the equation $R=c/2F$, where c is the velocity of light. Light reflected from the target is incoherently detected with a photodiode and converted into a voltage waveform which is mixed with an undelayed sample of the original modulation waveform. After "clutter" is removed, the waveform is processed coherently using the discrete Fourier transform to provide target amplitude and range information.

Similarly, B. L. Stann in "Research Progress on a Focal Plane Array Ladar System Using_Chirped_Amplitude_Modulation," Proc. SPIE Laser Radar Technology and Applications VIII, Vol. 5086, 2003, disclosed the construction of a 32×32 pixel focal plane array (FPA) LADAR architecture adapted for smart munitions, reconnaissance, face recognition, robotic navigation, etc., using chirped amplitude modulation. Ranging of the LADAR architecture was based on a frequency modulation/continuous wave technique implemented by directly amplitude modulating a near-IR diode laser transmitter with a radio frequency (rf) subcarrier that was linearly frequency modulated (chirped amplitude modulation). The diode's output was collected and projected to form an illumination field in the downrange image area. The returned signal was focused onto an array of optoelectronic mixing, metal-semiconductor-metal detectors where it was detected and mixed with a delayed replica of the laser modulation signal that modulates the responsivity of each detector. The output of each detector was an intermediate frequency (IF) signal resulting from the mixing process whose frequency was proportional to the target range. Sampling of the IF signal was done continuously over a period of the rf modulation, and a signal processor calculated the discrete fast Fourier transform over the IF waveform in each pixel to establish the ranges and amplitudes of all scatterers.

In addition to an "overhead" view, frequently it is beneficial to visualize the terrain from a perspective of an observer within the surrounding area. Three-dimensional (3-D) terrain mapping technology has been used to provide terrain visualization, with recent improvements being made in resolution, accuracy, quality, and amount of area covered. Resolution has increased to 1 m or better, and accuracy in absolute (world) coordinates of better than 1 m is available. Nonetheless, the transformation of 3-D maps from low resolutions, appropriate only to large areas, to high resolutions, useful at much smaller scales, requires a new approach to terrain visualization. The shortcomings of prior art terrain visualization techniques include those experienced in visualizing data acquired through sensors, such as light detection and ranging (Lidar) devices, that have been employed for applications such as detecting and tracking people and vehicles. Imaging techniques have also incorporated or adapted methods for detection of surface variations. When imaging smaller-scale scenes, conventional devices tend to under-sample small-scale features, such as foliage, fences, railings, and light poles. These features are difficult to identify and distinguish using the commonly employed terrain visualization techniques discussed above. Yet, it is important for a visualization to accommodate this under-sampling and to differentiate between these under-sampled objects and larger, smoother objects like vehicles.

Tracking vehicles and people is of great importance for military efforts. 3-D maps can provide important context information for such tracking, but visualization at both large and small scales is essential. It is important to not only render particular buildings or road intersections, but to meaningfully render the areas immediately surrounding these sites.

One commonly employed technique for terrain visualization involves the generation of single continuous surface. This technique works well for large-scale natural features, such as mountain ranges or canyons, and urban centers dominated by large buildings. Unfortunately, this technique falls short when used to visualize terrain data at smaller scales; natural features such as bushes and trees can become indistinguishable from small hills or man-made objects.

Another commonly available technique for terrain visualization involves the generation of a "cloud" of points. This technique avoids obscuring the rough nature of small-scale natural features, such as bushes and trees. Unfortunately, these natural features are still difficult to identify because the points generated by large-scale features, such as the ground and buildings, tend to predominate and obscure the points generated by small-scale features. Moreover, large-scale features themselves are inadequately rendered with point clouds because point clouds detract from the solid nature of large-scale features.

Examples of conventional three-dimensional (3-D) terrain maps include maps generated by the Rapid Terrain Visualization (RTV) program, now known as the BuckEye, which is run by the Joint Precision Strike Demonstration Project Office, to provide rapid generation of digital terrain data to support emerging crisis or contingency operations. The RTV program maps from an aircraft using both laser radar (ladar) and interferometric synthetic aperture radar sensors. The ladar has higher resolution and produces cleaner and more accurate maps, so ladar data is preferred. This sensor measures the terrain elevation by scanning the area with a laser beam and measuring the time it takes the light to travel from the aircraft sensor to the ground and back. For the ladar, the program advertises a resolution (post spacing) of 1 m, a vertical accuracy of 15-30 cm, and a horizontal accuracy of 30-50 cm. The maps comprise three pieces of information for each 1-m$^2$ pixel: a backscatter intensity value approximately equivalent to a black and white photograph, the elevation of the first backscatter return from the laser (the highest thing hit), and the elevation of the last return (the lowest thing hit). For most pixels, these two elevations will be the same. But where bushes or trees are present, some of the laser energy will be reflected from the top of the trees as a first-hit return, but some laser energy will also penetrate down to ground to produce the last-hit return. The RTV program also provides a fourth, derived product that is a color image combining the intensity image with hues that are derived from the elevations.

Another currently available three-dimensional imaging software program is "3DEM Software for Terrain Visualization and Flyby Animation," found at the website http://www.visualizationsoftware.com/software.arcgis/explorer/index.html. According to the website, the program will produce three dimensional terrain scenes and flyby animations from a wide variety of freely available data sources including: USGS Digital Elevation Model (ASCII DEM) files; USGS Spatial Data Transfer Standard (SDTS DEM) files; NASA Shuttle Radar Topography Mission (SRTM) files; LIDAR Point Cloud (LAS) files; USGS Global 30 Arc Second Elevation Data Set (GTOPO30 DEM) files; NOAA Global Land One-km Base Elevation (GLOBE DEM) files; NASA Mars Orbiter Laser Altimeter (MOLA) files. Any topographic data file organized by rows and columns of elevation data XYZ, scattered point topographic data files, and terrain data files can be saved in the following formats for use by other GIS programs: USGS ASCII Digital Elevation Model (*.dem), GeoTiff Graphics File (*.tif), GeoTiff Digital Elevation Model (*.tif), Binary terrain matrix (*.bin), VRML world (*.wrl) and Terragen terrain (*.ter). Also according to the website, 3DEM can merge multiple DEMs to provide high-resolution overhead maps and 3D projections of large surface areas, limited only by the computer's memory. Geographic coordinates (latitude and longitude) are shown on all overhead map displays. Both Lat-Lon and UTM coordinates are supported, allowing display and measurement of position to high accuracy. Global Positioning System (GPS) receiver waypoints, routes, and tracks can be read via serial interface and displayed on 3D images and flybys of the terrain, allowing visualization of the path of a trek through the wilderness. 3DEM uses the SGI/Microsoft OpenGL libraries for high speed 3D rendering. 3DEM will render 24 bit color three dimensional projections or red-blue projections requiring red-blue 3D glasses for viewing. 3DEM scenes can be saved in various formats; including Windows Bitmap (*.bmp) and jpeg. 3DEM allows low resolution flyby of DEM landscapes using OpenGL. The path through space is recorded in memory during flight, allowing subsequent creation of a full resolution mpeg animation along the flight path. Real-time flyby animations can be created in the following formats Flyby animation AVI (*.avi) a and Flyby animation MPEG (*.mpg, *.mpeg). 3DEM provides an intuitive user interface, high reliability, and detailed terrain images and flyby animations created from freely available terrain data. 3DEM is a product of Visualization Software LLC by Richard Home. Maps, three-dimensional terrain images and animations, and GPS waypoints and routes produced by the 3DEM computer program are for general visualization purposes only.

Another example of mapping software is disclosed at Http://www.esri.com/softwar-e/arcgis/explorer/index.html. According to the website:

> The ArcGIS Explorer is a free downloadable application that offers an easy way to access online GIS content and capabilities. With ArcGIS Explorer, [one] can connect to a variety of free, ready-to-use datasets hosted by ESRI. Combine these with local data or other 2D and 3D Web services to create custom maps and . . . perform spatial analysis. With ArcGIS Explorer, [one] can Fuse your local data with data and services from ArcGIS Server, ArcIMS, and Open Geospatial Consortium WMS to create custom maps . . . [and] [p]erform GIS analysis (e.g., visibility, modeling, proximity search). . . .

Another terrain software imaging program is the Google-Earth type local search and exploration task. In addition to larger-scale views to get context, one is often interested in areas of a square block or less in the immediate vicinity of one's destination. Such a search is conventionally done with traditional 2-D maps or, in a very select few areas, with pseudo-3-D maps generated by adding 3-D building models to the 2-D maps.

Aside from the above-described need to better images of small-scale features, such as foliage, fences, railings, and light poles, there are many other applications that require smaller size scales. One particularly important application is site surveillance. The objects of site surveillance are often people and the focus of attention is surveillance of a small area around a specific building for a potential intruder. Locations of individual trees and bushes, hedges, small ravines, banks, and other natural features become relevant in determining access routes and potential cover. After an alarm, they are also important in judging intent and determining the best response. Therefore, a visualization technique is required that portrays both small and large features and as well as natural and manmade features. Accordingly, there exists a need for a terrain map with increased accuracy in revealing three dimensional aspects of the object or terrain.

SUMMARY OF THE INVENTION

A preferred embodiment of the present invention utilizes 3-D ladar-generated maps. 3-D terrain maps are available from a number of sources, including for example, those generated by the Rapid Terrain Visualization (RTV) program, now known as the BuckEye, run by the Joint Precision Strike Demonstration Project Office, which provides rapid generation of digital terrain data in support of emerging crisis or contingency operations.

The RTV program maps are generated from an aircraft using both laser radar (LADAR) and interferometric synthetic aperture radar sensors. The LADAR is preferred as it has higher resolution and produces cleaner and more accurate maps. The LADAR sensor measures the terrain elevation by scanning the area with a laser beam and measuring the time it takes the light to travel from the aircraft sensor to the ground and back. For the LADAR sensor, the program advertises a resolution (post spacing) of 1 m, a vertical accuracy of 15-30 cm, and a horizontal accuracy of 30-50 cm. The maps comprise three pieces of information for each 1-m$^2$ pixel: a backscatter intensity value approximately equivalent to a black and white photograph, the elevation of the first backscatter return from the laser (the highest thing hit), and the elevation of the last return (the lowest thing hit). For most pixels, these two elevations will be the same, but where bushes or trees are present, some of the laser energy will be reflected from the top of the trees as a first-hit return, but some laser energy will also penetrate down to ground to produce the last-hit return. The RTV program also provides a fourth, derived product that is a color image combining the intensity image with hues that are derived from the elevations.

The three-dimensional terrain visualizing method of a preferred embodiment of the present invention generates images of both "rough" and "smooth" areas in a terrain with increased detail. Terrain mapping data is processed as a series of pixels, with pixels in relatively "rough" areas being depicted without modification, while pixels in relatively "smooth" areas are effectively "joined" together to eliminate the small gaps in the surfaces. The preferred embodiment technique for identifying and joining relatively "smooth" areas as used herein is referred to herein as "texture-based segmentation."

A preferred embodiment algorithm, as described in detail below, identifies relatively "smooth" local areas and warps the squares for these areas so that the edges meet and the surface is continuous. Areas that are truly "rough," such as trees, are left as disjoint squares. Overall, the effects on the squares before and after the algorithm is applied is minimal, so that algorithm errors are not conspicuous.

In some preferred embodiments of present invention, the texture-based segmentation algorithm fuses the discrete rectangles to create a continuous surface where the map is relatively "smooth." It works locally at each pixel within a 3-by-3 neighborhood of the pixel and determines whether the pixel is part of a relatively "smooth" surface by attempting to construct 4 lines through the pixel. If the two halves of a line have sufficiently similar slopes, that is, if the range difference from the center pixel and its neighbor on one side is close enough to the range difference to the neighbor on the other side, then that line is determined to be "valid." If 3 out of the 4 possible lines are "valid," then the center pixel is identified as locally "smooth," and a corner vertex in the center pixel is joined with the adjacent vertices in the neighbor pixels that contributed to the pixel being identified as locally "smooth."

Although the technique is described with respect to vertical imaging from the air, the technique is just as applicable in the horizontal plane (for ground-based ladars, primarily). The key distinction is that the information to be visualized come from a sensor like a ladar that makes discrete measurements of the scene. Synthesizing or modeling has been the most common approach to creating 3-D scenes. However, ladars (both airborne and vehicle-carried) can map huge areas cheaply and quickly; and it is predicted that it will have even more applications in the future. For example, by attaching a ladar to a vehicle, one can obtain a 3-D map of a city in virtually perfect detail. This would provide a viewpoint not just from the viewpoint collected, but anywhere within the perimeter of the area recorded. For example, if one were to be interested in a particular corner, the relevant 3-D image for the particular corner could be downloaded from a repository.

These and other aspects of the embodiments of the invention will be better appreciated and understood when considered in conjunction with the following description and the accompanying drawings. It should be understood, however, that the following descriptions, while indicating preferred embodiments of the invention and numerous specific details thereof, are given by way of illustration and not of limitation. Many changes and modifications may be made within the scope of the embodiments of the invention without departing from the spirit thereof, and the embodiments of the invention include all such modifications.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
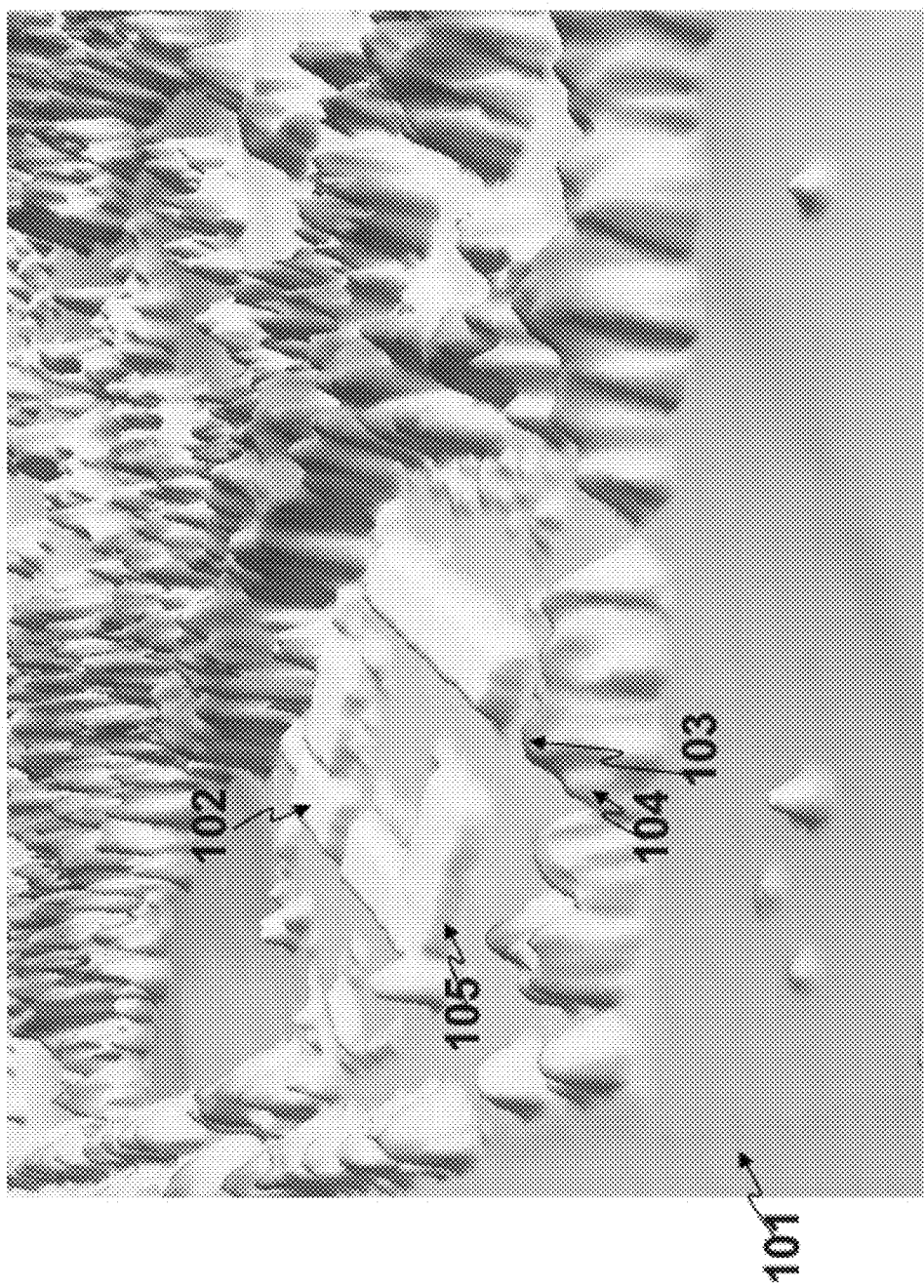
FIG. 1 is an example of an alternative to the claimed method.

A more complete appreciation of the invention will be readily obtained by reference to the following Description of the Preferred Embodiments and the accompanying drawings in which like numerals in different figures represent the same structures or elements. The representations in each of the figures are diagrammatic and no attempt is made to indicate actual scales or precise ratios. Proportional relationships are shown as approximates.

DETAILED DESCRIPTION

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skilled in the art to practice the embodiments of the invention. Accordingly, the examples should not be construed as limiting the scope of the embodiments of the invention.

The terminology used herein is for the purpose of describing particular embodiments only and is not intended to limit the full scope of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element such as an object, layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that, although the terms first, second, etc. may be used herein to describe various elements, components, regions, layers and/or sections, these elements, components, regions, layers and/or sections should not be limited by these terms. For example, when referring first and second photons in a photon pair, these terms are only used to distinguish one element, component, region, layer or section from another region, layer or section. Thus, a first element, component, region, layer or section discussed below could be termed a second element, component, region, layer or section without departing from the teachings of the present invention.

Furthermore, relative terms, such as "lower" or "bottom" and "upper" or "top," may be used herein to describe one element's relationship to other elements as illustrated in the Figures. It will be understood that relative terms are intended to encompass different orientations of the device in addition to the orientation depicted in the Figures. For example, if the device in the Figures is turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below. Furthermore, the term "outer" may be used to refer to a surface and/or layer that is farthest away from a substrate.

Embodiments of the present invention are described herein with reference to cross-section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region or object illustrated as a rectangular will, typically, have tapered, rounded or curved features. Thus, the regions illustrated in the figures are schematic in nature and their shapes are not intended to illustrate the precise shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will also be appreciated by those of skill in the art that references to a structure or feature that is disposed "adjacent" another feature may have portions that overlap or underlie the adjacent feature.

The following are definitions of some of the terms used in the detailed description. This list of terms is not exclusive—additional terms may be defined in or may need to be understood in light of the specification. Although the words appear in capitals, the word(s) need not have capitals for the definition(s) to apply.

COMPUTATIONAL DEVICE or PROCESSOR as used herein includes one or more general purpose computers, CPUs, multiprocessors, microprocessors, processors, special purpose computers, quantum computers, special hardware devices, or other machines that perform computations and/or process the data used by the preferred embodiment of the present invention. A set of individual computational devices that are linked together through a communications mechanism, such as a network connection, would be treated as a single computational device.

COMPUTER-READABLE MEDIUM as used herein means a storage medium such as a hard drive, floppy drive, CD-ROM, DVD, USB drive, flash memory, read only memory, or some other medium that a computer can readily process. Multiple media can be also be used.

COMPUTER-READABLE PROGRAM CODE as used herein means machine code, compilable source code, or interpretable scripting code.

DISPLAYING as used herein means the rendering of a terrain or other image. Displaying can be performed for the benefit of people through various devices such as computer monitors, stereoscopic displays, plotters, or printers. Displaying can also be performed for the benefit of other systems. Writing a series of coordinates to a file or to memory for used by another system that can use those coordinates to create an image is a method of displaying.

DRAWING as used in this application, is the act of computing where something should go. For example, drawing a line through two coordinates does not mean actually making a line visible, but simply identifying the beginning and ending coordinates.

ELEVATION as used herein is a value indicating how far a point is from a base topography. Meters above sea-level is an example of a unit of elevation based on the average sea level of the earth. Elevation does not have to be on a linear scale. For example, logarithmic elevation values can be used, such that incrementing an elevation in logarithmic scale might mean a doubling of the elevation in absolute terms. Elevation is relative to the base topography. A painting hung on a wall has an elevation when compared with the wall that is different from the elevation when compared with the floor. The base topography itself does not have to be flat. For example, elevation data could be obtained by taking the height above sea level at every point along the equator. This would produce a circular base topography with elevations relative to the sea level along the equator.

As used herein, NORTH, EAST, SOUTH, WEST, and combinations such as NORTHEAST and SOUTHWESTERN are directional words that relate to a reference point and/or orientation. They do not mean absolute directional values. Thus, a test pixel may be oriented so that its northern neighbor pixel is actually south of the test pixel in the real world. Moreover, the directions are not necessary restricted to a particular plane and are equally applicable to a vertical plane. Similarly, the nomenclature of top, top left, top right, bottom, middle, left, bottom left, right, and bottom right, or the equivalent could be utilized with equal effect.

PIXEL as used herein, as it relates to digital imaging, is an elemental piece of information in an image. Pixels may be arranged in a 2-dimensional grid or 3 dimensional grid and may be represented using dots, squares, rectangles, or some other geometric object. An image is formed from a plurality of pixels and each pixel is an element of an image. The intensity of each pixel is variable; in color systems, each pixel may have three or four components such as red, green, and blue, or cyan, magenta, yellow, and black. In the visualization technique of some preferred embodiments of the present invention, a mapped surface is divided into equal-sized squares. Each rendered surface datum or element within a square may be treated as a pixel. Other embodiments of the invention may or may not necessarily use square or uniform pixels. A pixel in the sense used in this application differs from a pixel in the sense of the smallest unit of display on a computer monitor. Computer monitor pixels typically only display the colors red, green, and blue, where each color has a uniform intensity throughout the computer monitor pixel, to the extent that the technology supports such uniformity. A pixel, as used in this application, can contain multiple colors and intensities. For example, elevation data might be more course than image data for a terrain. The pixels used to visualize the elevations might therefore be larger than the colors and intensities representing the terrain image.

SENSOR as used herein means any device that can map terrain. Common terrain mapping devices include light detection and ranging (LIDAR) devices, sometimes called laser radar (LADAR), and interferometric synthetic aperture radar sensors. Many other technologies can provide terrain mapping data. For example, sonar can map the terrain of the ocean floor. Stereo photographs can also be used to map terrain.

TERRAIN as used herein means any set of surfaces for which elevation from a base topography can be acquired. This might be a city, a forest, the ocean floor, a wall, an extraterrestrial planet surface, 3-D microscopic imagery or some other set of surfaces.

Figure 15:
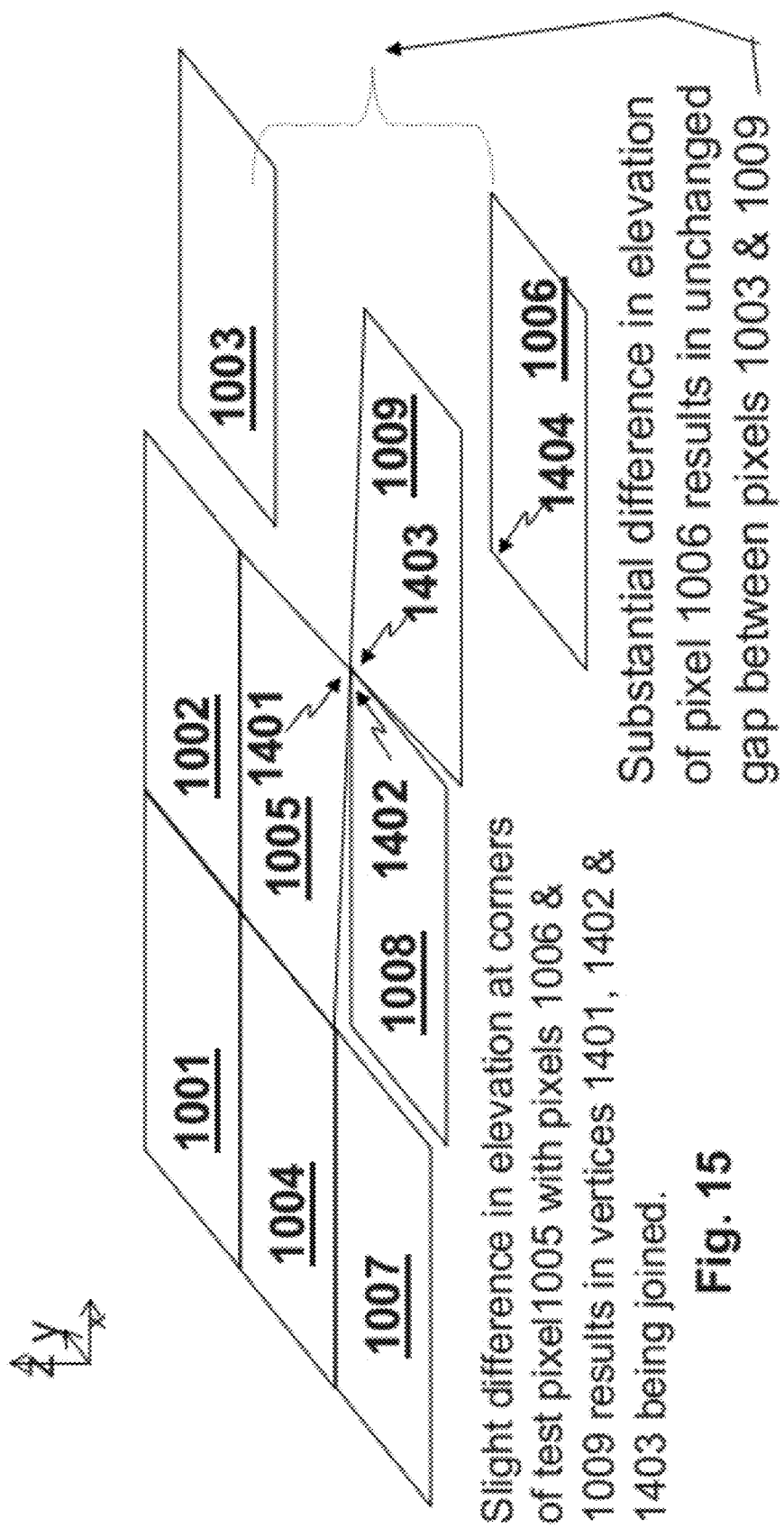
FIG. 15 shows test pixel after texture-based segmentation.

WARPING as used herein refers to the distortion of the perimeter of a pixel to the extent that it is joined with adjacent pixels. A pixel is "warped" when one of the vertices of the surface is moved to a new position and the surface is modified so that the surface touches all of the unaltered vertices and the altered vertex. There are many ways of accomplishing this task that are known in the art. One simple way is to generate triangular surfaces such that the triangles connect with all of the required vertices and to each other. Other variations are possible. Many tools readily available to the ordinary practitioner can readily warp a 3-D surface. FIG. 15 shows the warping of the vertices 1401, 1402 and 1403 such that they make contact with each other.

FIG. 1 shows an example of how terrain data is rendered by the 3DEM-RTV program written for BuckEye by Visualization Software LLC and is typical of most rendering techniques. This rendering shows a portion of the National Arboreturn in the District of Columbia. This rendering depicts several buildings surrounded by trees. The technique creates a single continuous surface that is draped over the regularly-spaced RTV elevation data.

In FIG. 1, the ground 101 and building rooftops 102 are readily identifiable. With this particular technique, the sides of the buildings 105 also appear to be depicted because this rendering technique creates surfaces that connect data points, even when there is a significant gap between the data points. In this case, this depiction is misleading. Terrain data was collected from nearly overhead, so there was little actual data on what was on the sides of buildings.

Creating surfaces to connect data points obscures small-scale features, such as the trees surrounding the buildings in FIG. 1. Tree tops 103 are rendered, but the surfaces connecting them to the ground 101 make them look like hills or mountains. This severely undermines efforts to understand the nature of the depicted terrain.

Figure 2:
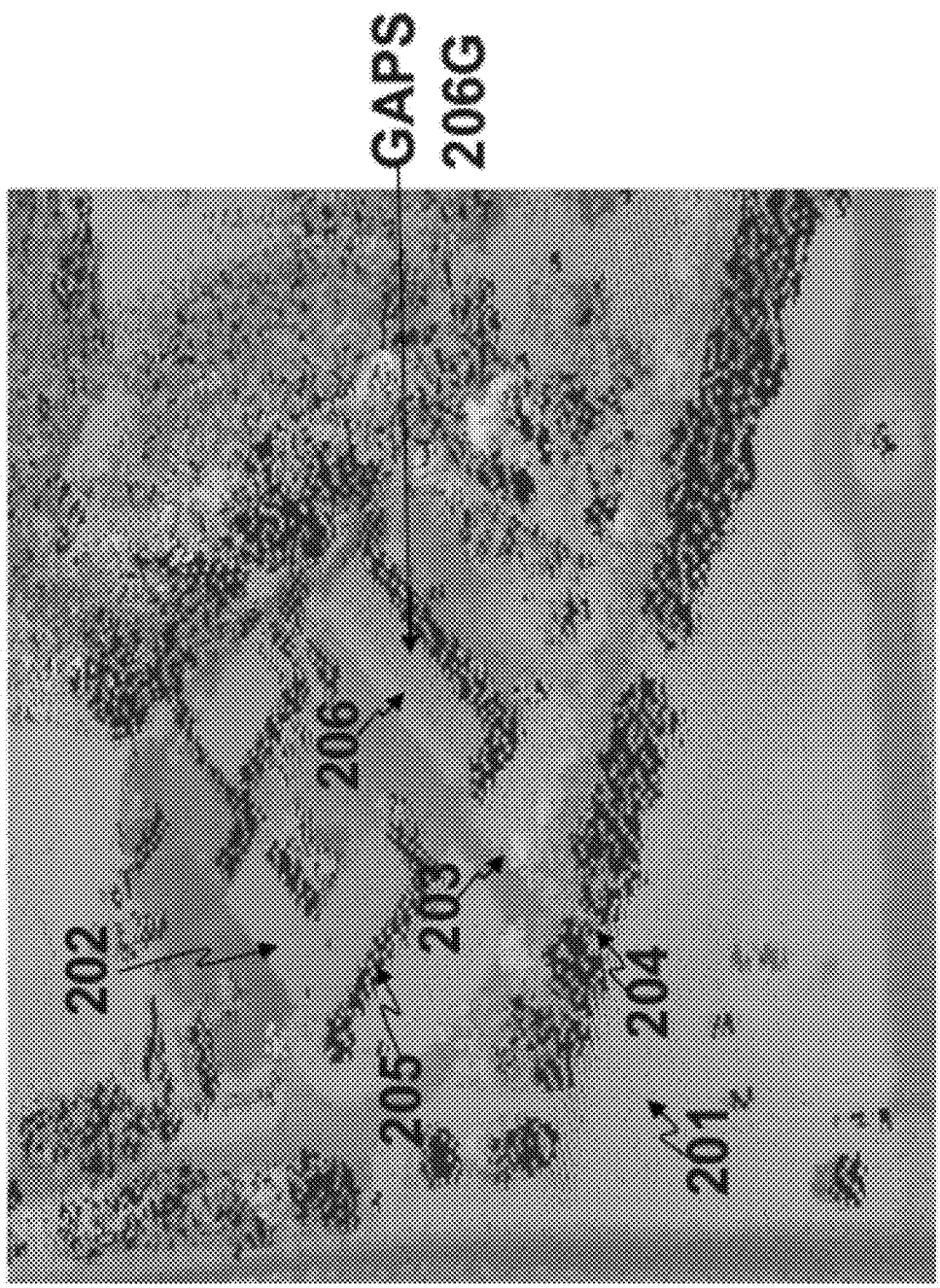
FIG. 2 shows visualization without texture-based segmentation.

FIG. 2 shows the same Arboretum scene produced by a melding of the point-cloud approach traditionally used to view ground-based ladar images and the continuous surface approach used to view terrain maps. FIG. 2 was generated by displaying each elevation sample using a disjoint horizontal square, or pixel, centered at the x-y location and elevation of the sample. The size of each pixel is the same as the post spacing—in this case 1 m—so a flat horizontal surface would be precisely tiled by the pixels and would appear as a continuous surface. The trees and bushes are rendered in a very natural way with a series of small, disconnected patches that look very much like stylized leaves and that one can see through. The tree rendering compares reasonably with computer-aided design (CAD) techniques that are much more costly in manpower and machine resources. The ground and the building roofs, on the other hand are visualized as continuous surfaces. Many surfaces like roads, grass and flat roofs are approximately horizontal and look quite good with this simple approach.

Substantially similar information identifiable in FIG. 1 is identifiable in FIG. 2. The ground 201 and roof tops 202 are both readily identifiable. The building sides 205 are also identifiable, but they are identifiable as an area where little information was available to the rendering engine. This approach avoids misleading the viewer into believing that more is known about the terrain than is actually known. The human mind quickly fills in the gaps and understands that there is some structure holding the roof tops 202, but that the details of the structure are unknown. This conservative approach to rendering data stands out when rendering features that are not connected to the surface below, such as bridges.

Tree tops 203 may be much easier to interpret using this visualization approach. The sides of the trees 204 are only depicted where data was actually sampled, and the rough data remains rough. This makes the trees more closely resemble trees than the depiction of trees in FIG. 1.

While the visualization in FIG. 2 is an improvement over the visualization in FIG. 1, there are small gaps between pixels representing surfaces that are not quite horizontal. One building rooftop 206 shows a number of these small gaps (resembling a series of rows of short lines; referenced as 206G in FIG. 2). These gaps clutter the image and make the contrast with bushes and trees less obvious.

Figure 3:
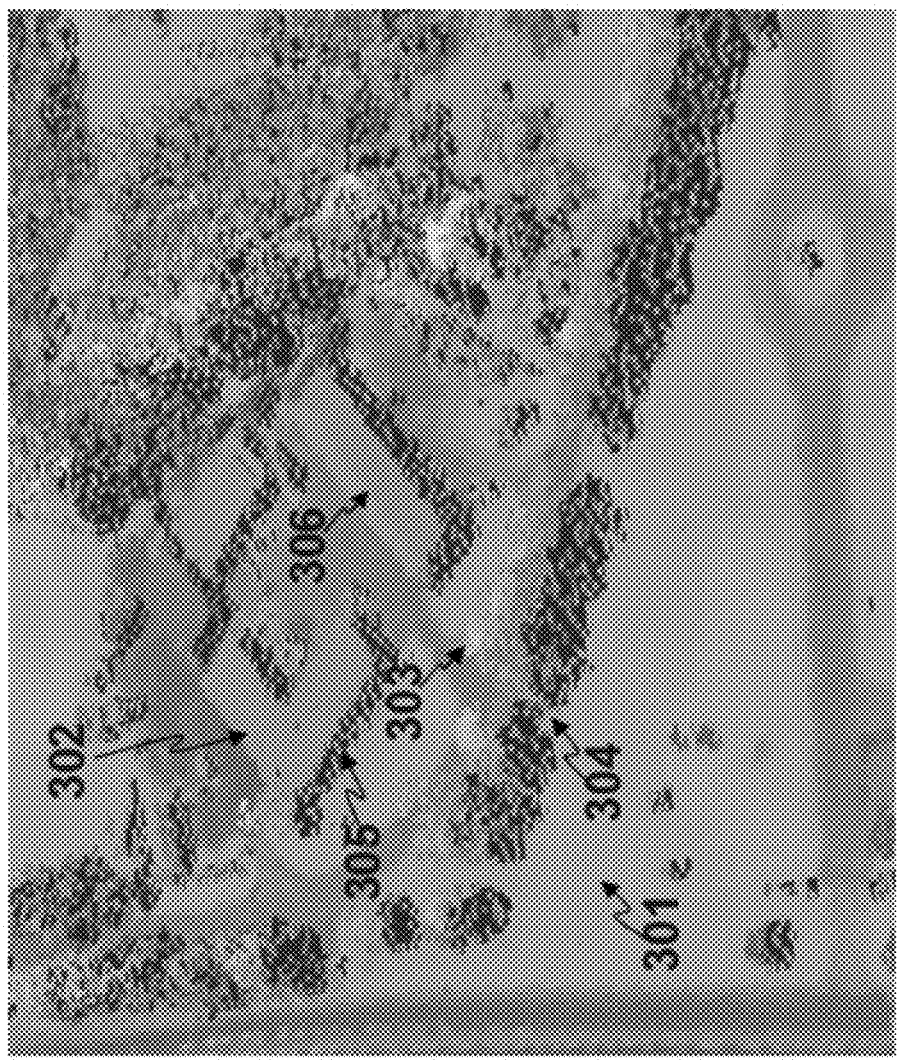
FIG. 3 shows visualization with texture-based segmentation.

FIG. 3 shows the Arboreturn scene as the previous FIG. 2. FIG. 3 depicts the scene of FIG. 2 after texture-based segmentation has been applied to the rendered pixels. The ground 301, roof tops 302, tree tops 303, tree sides 304, and building sides 305 are all identifiable in this image. Many of the small gaps between pixels representing non-horizontal surfaces have been eliminated in this image. The building rooftop 306 is remarkably smoother in this depiction than its depiction 206 in FIG. 2. Reducing these gaps unclutters the image, making the contrast with bushes and trees more obvious.

Figure 4:
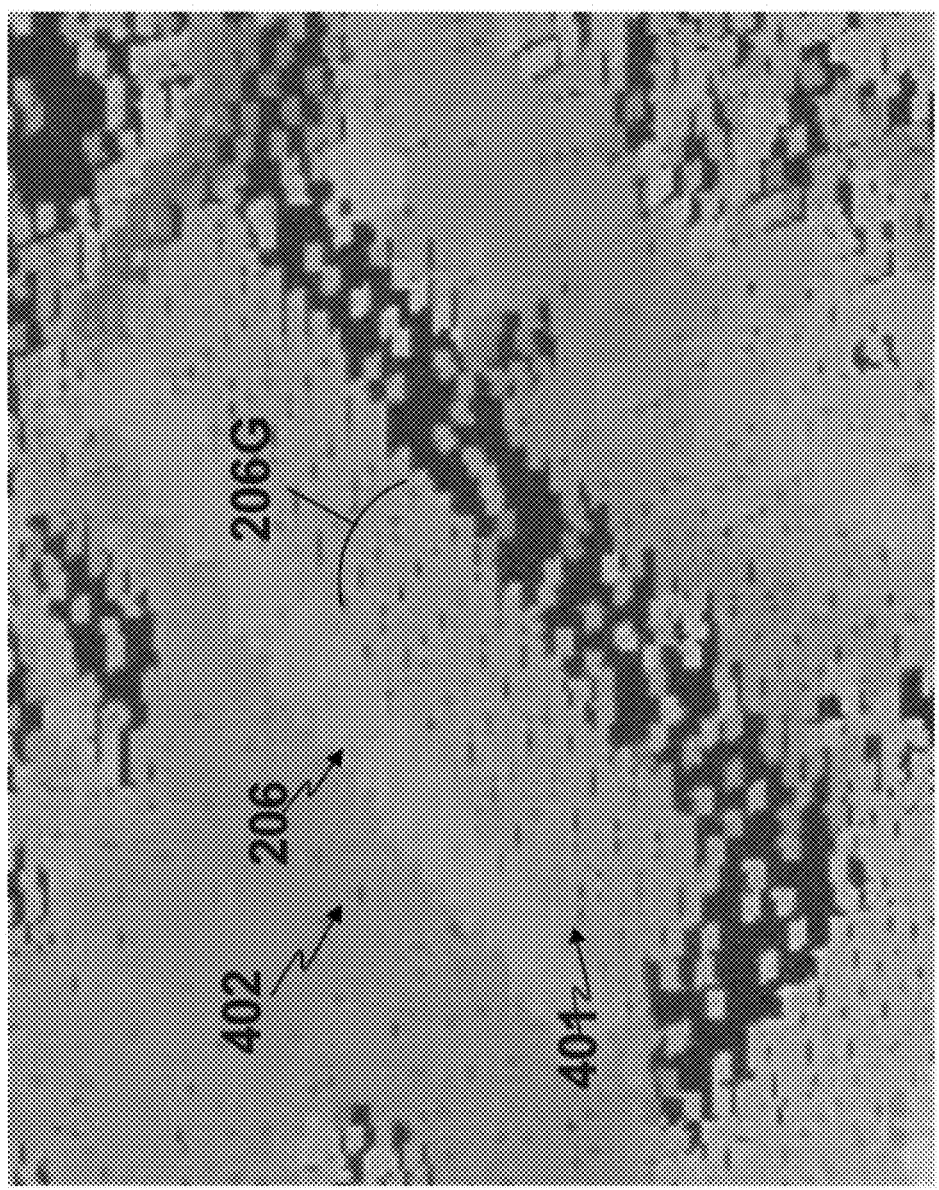
FIG. 4 shows closer view of visualization without texture-based segmentation.
Figure 5:
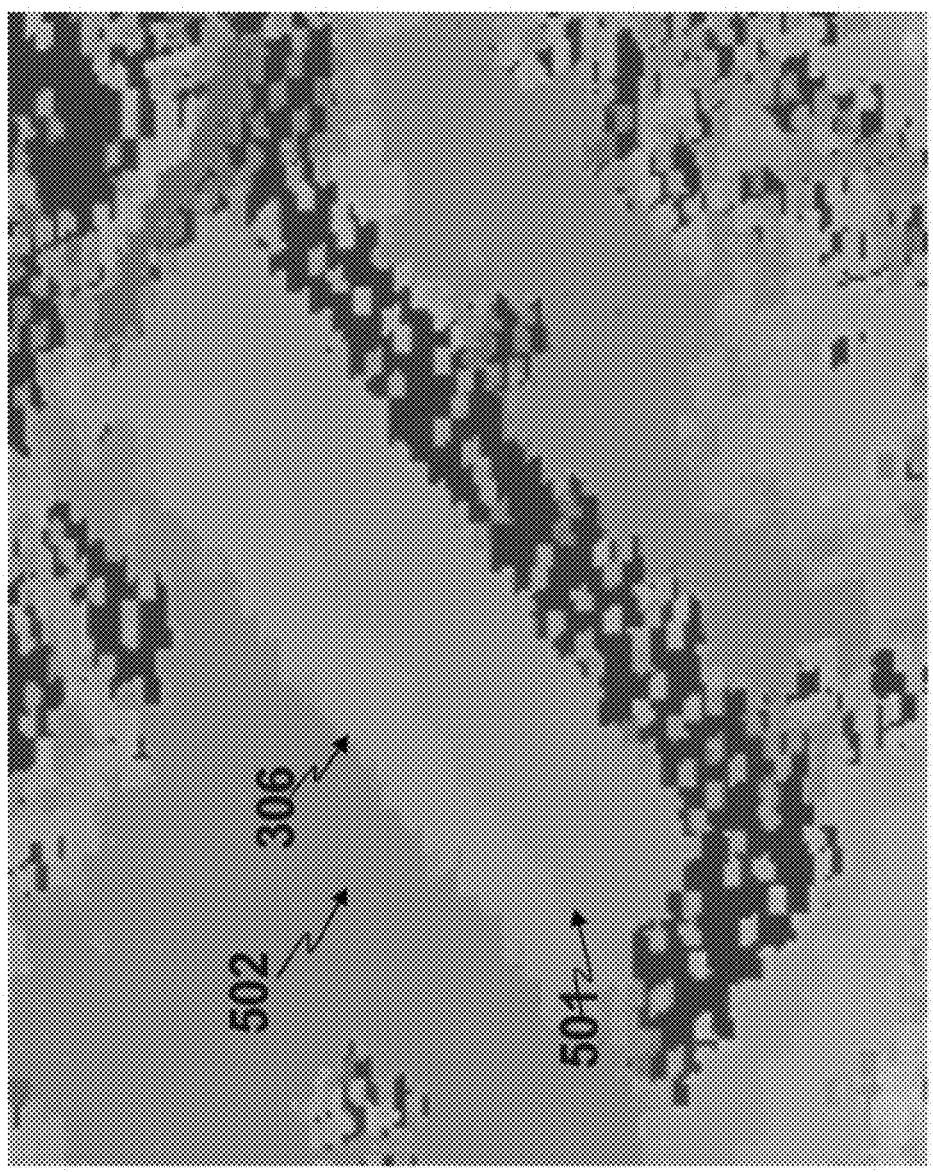
FIG. 5 shows closer view of visualization with texture-based segmentation.

FIGS. 4 and 5 are close-ups of the building in FIGS. 2 and 3. In FIG. 4, the artifacts created by the pixel gaps can be seen on both the rooftop 401 and the ground 402. The small gaps (resembling a series of rows of short lines; referenced as 206G in FIG. 2) are similarly referenced as 206G in FIG. 4.

FIG. 5, which shows approximately the same information as FIG. 4, but with texture-based segmentation applied. FIG. 5 depicts the building 306 and surrounding area (as shown in FIG. 3) in more detail. In this depiction, the artifacts from pixel gaps have been largely eliminated from both the rooftop 501 and the ground 502.

The texture-based segmentation algorithm of a preferred embodiment is designed to eliminate the small gaps in surfaces that are basically "smooth," i.e., without sharp changes in elevation. This algorithm, described in detail below, identifies locally relatively "smooth" areas and "warps" the squares for these areas so that the edges meet and the surface is continuous. Areas that are truly "rough," such as trees, are left as disjoint squares. One important feature of this procedure is that there is only a small difference between the squares (or pixels) before and after the algorithm is applied, so algorithm errors are not conspicuous. Thus, the algorithm does not need to be extremely reliable and can be fast and simple. The algorithm may occasionally leave a gap in a relatively "smooth" area or occasionally joins several squares in a tree; but such "errors" or gaps are almost imperceptible. The visual impression is to eliminate most of the small gaps in smooth surfaces making more striking the contrast between roads, grass and buildings that are smooth and disjoint undersampled objects like trees. Thus, the algorithm does not need to be extremely reliable and can be fast and simple.

For the map colors, the hue is a function of the elevation, with the highest elevations mapping to red, then through yellow and green to blue, which is the lowest map elevation. The display intensity is mapped to the intensity image from the ladar, which is very useful in distinguishing features like roads that do not differ much in elevation from their surroundings but are much darker than the surrounding grass. The 3DEM-RTV viewer, illustrated in FIG. 1, derives intensity from a shading algorithm, which is particularly inappropriate for this scene since it mostly highlights the draping of the surface over the trees. Other viewers, such as ESRI ArcGIS Explorer, paint photographs as texture onto the elevation surface, an approach that produces better quality images than the 3DEM-RTV.

Figure 6:
FIG. 6 shows visualization with rainbow color scheme; demonstrating that the technique works with different colors.
Figure 7:
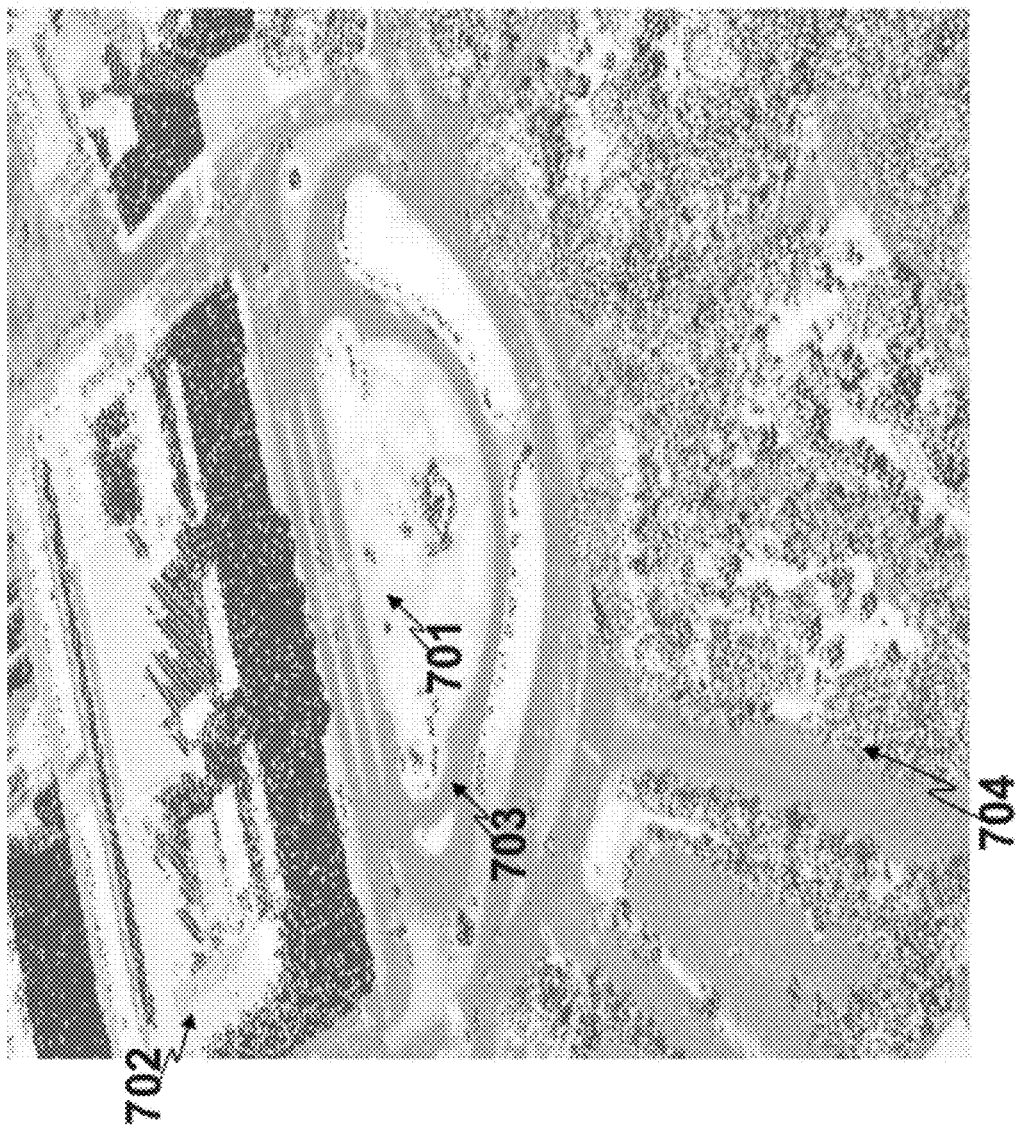
FIG. 7 shows visualization with externally supplied color scheme.

FIG. 6 demonstrates the use of different hues and intensities to visualize terrain data. The location depicted in FIGS. 6 and 7 is Union Station in the District of Columbia. The red brick plaza in front of the station building 602, asphalt surfaces 603, and natural features such as trees 604 area identifiable in this rendering. The hues used in this rendering are based on the elevation of the sampled surfaces. Lower elevation surfaces are depicted in yellow while higher elevation surfaces are depicted as red. The lightness of the pixels in this rendering come from a backscatter intensity value, which is low when sampling surfaces that absorb energy, such as asphalt, and high when sampling surfaces that reflect energy, such as grass. The saturation is not affected by any data values with this particular scheme, but various embodiments of the invention could modify saturation in response to terrain data.

FIG. 7 demonstrates another method of selecting hue, lightness, and saturation. In this instance, the lower elevations are depicted using shades of green while higher elevations are depicted using shades of yellow. The red brick plaza 701 in front of the station building 702, asphalt surfaces 703, and natural features such as trees 704 area also identifiable in this rendering. The color data used in this figure was provided by an external data source.

Alternative methods of selecting pixel hues and intensities may be employed without deviating from the scope of the claimed invention. For example, photographic imagery can be matched with each pixel to provide significant detail. Metrics, such as population density or land usage, can also enhance terrain imagery.

Stereoscopic viewing is very useful in viewing any 3-D terrain map. However, it is particularly useful for smaller scales with foliage and other objects that are under-sampled. When we look through something like foliage, the stereo is very helpful in sorting out the complex scenes with objects at different ranges.

Figure 8:
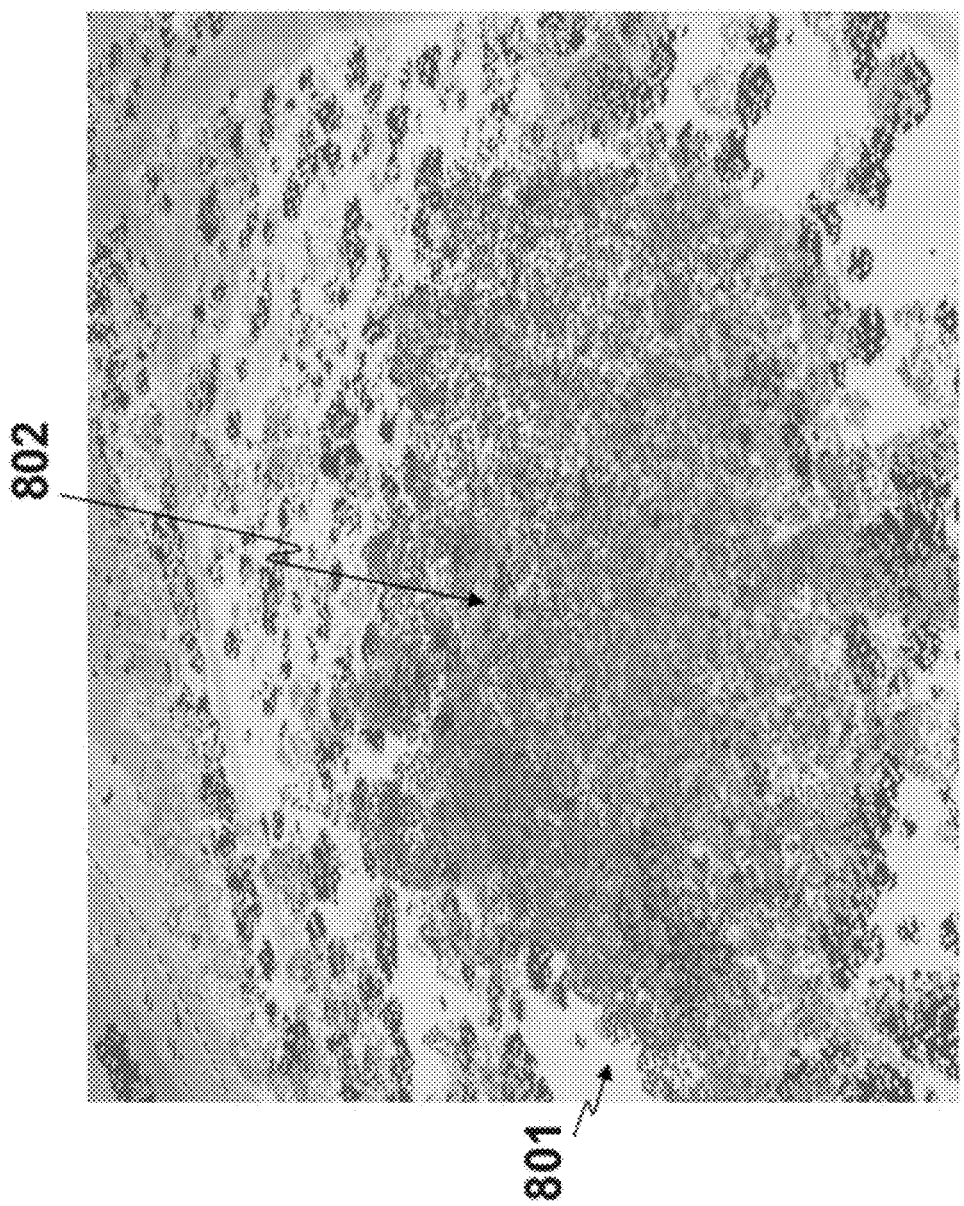
FIG. 8 shows visualization with both upper and lower layers displayed.

FIG. 8 demonstrates the visualization of terrain with multiple layers of pixels. The dataset used to produce this image contained both a lower elevation value and an upper elevation value. Lower and upper elevation values correlate to the backscattered data referenced in the foregoing description of the Rapid Terrain Visualization (RTV) program, now known as the BuckEye. Where lower elevation values and upper elevation values were approximately equal, only a lower pixel layer was rendered. Where lower elevation values and upper elevation values were sufficiently distinct, both a lower pixel layer and an upper pixel layer were rendered. Texture-based segmentation was applied to the lower pixel layer, but not the upper pixel layer. This figure shows the depiction of both lower and upper layers simultaneously. Unobscured ground pixels 801 are visible. Natural foliage 802 is also visible, but is clearly not the at ground elevation. In embodiments of the invention that provide for visualization of terrain data from different positions, transforming a rendered scene through operations such as rotation can reveal different layers simultaneously. This feature is not possible when a scene is rendered with a single continuous layer, as is commonly depicted.

Figure 9:
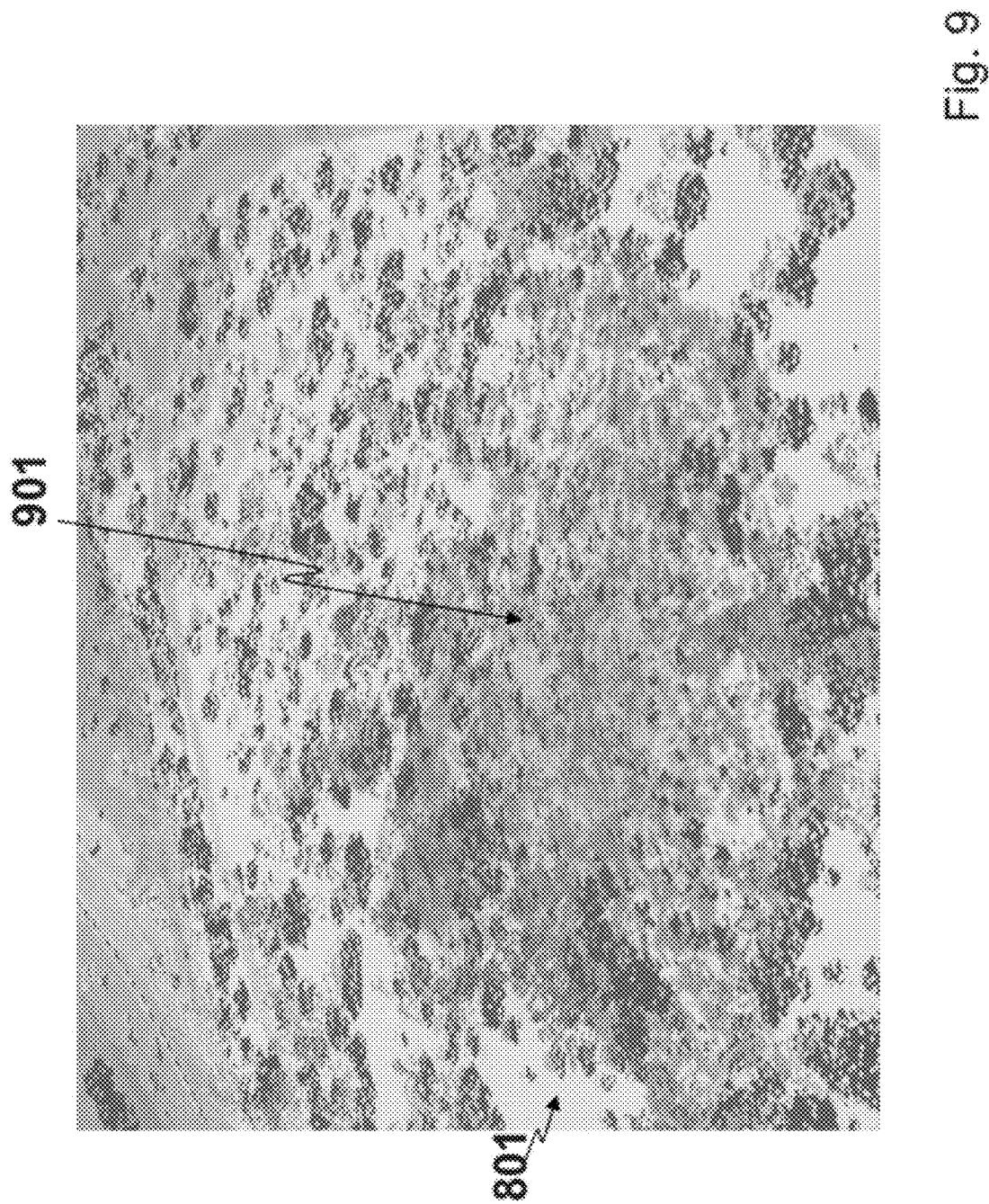
FIG. 9 shows visualization with upper layer removed.

FIG. 9 demonstrates how making select layers of pixels non-opaque can add to the analytical value of 3-D terrain visualization. This figure shows the same information as FIG. 8, but with the upper layer made completely transparent. The unobscured ground pixels 801 are still visible. With the upper layer removed, previously obscured ground pixels 901 are also visible. Select layers of pixels could be made semi-opaque to allow for visualization of multiple layers simultaneously.

Some embodiments of the invention may enable switching between the modes of displaying and hiding upper layers. This has many practical applications, such as aiding in the identification of vehicles and other smooth objects that have been hidden under foliage.

Figure 10:
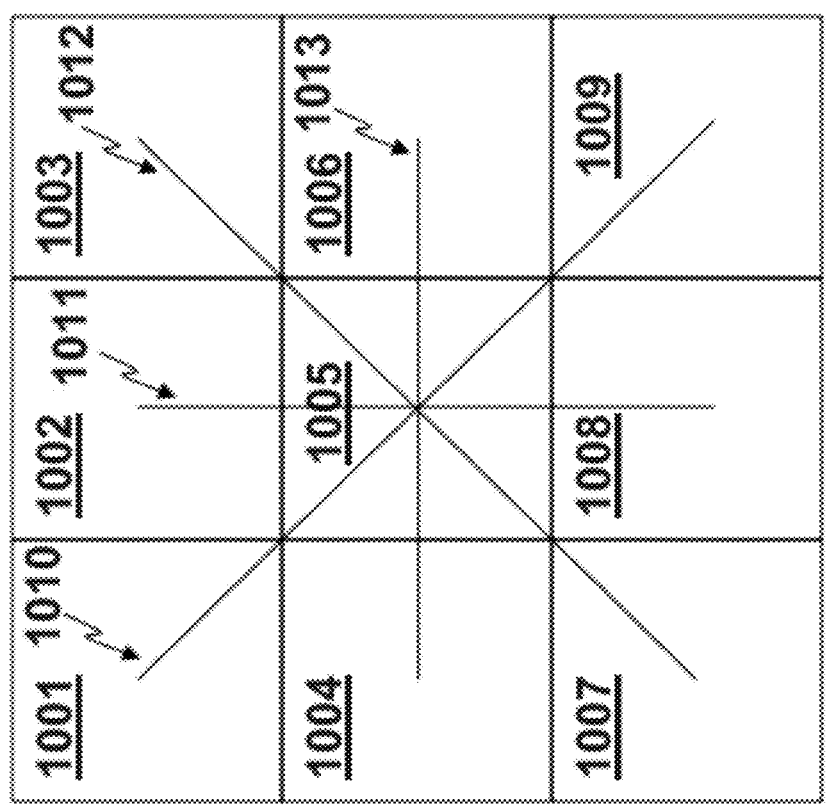
FIG. 10 shows test pixel with neighboring pixels.

FIG. 10 is an overhead depiction of a test pixel with its neighboring pixels. Test pixels are identified during the texture-based segmentation process. Note that the pixels are contiguous in the overhead view of the image. A potential advantage of texture-based segmentation is that it can help distinguish between highly-sampled smooth surfaces and poorly-sampled rough surfaces. Smooth surfaces are joined together to avoid artifacts from gaps between the pixels and rough surfaces are displayed without making any connections so as to avoid creating misleading visualizations.

Texture-based segmentation involves iteratively reviewing a set of pixels to identify locally smooth areas. When a pixel is being examined to determine whether it is in a locally smooth area, it is identified as the test pixel 1005. When the pixels are laid out on a Cartesian coordinate system, the neighbors of the test pixel 1005 can be identified as the northwestern neighbor 1001, the northern neighbor 1002, the northeastern neighbor 1003, the western neighbor 1004, the eastern neighbor 1006, the southwestern neighbor 1007, the southern neighbor 1008, and the southeastern neighbor 1009. Similarly, the coordinate system may reference a vertical plane as top, middle, bottom, top left, top right, middle left, middle right, bottom left, bottom right, without departing from the scope of the present invention.

FIG. 10 also depicts a series of test lines. These are lines that are not necessarily depicted during rendering, but are conceptual lines used to help determine whether the test pixel is in a locally smooth area. If the pixels are arranged in a Cartesian coordinate system, then the following test lines are possible: a northwest-southeast test line 1010, a north-south test line 1011, a northeast-southwest test line 1012, and a west-east test line 1013. The northwest-southeast test line 1010 is drawn by creating a straight line starting at the center of the northwestern neighbor 1001 and going to the center of the test pixel 1005, then drawing another straight line starting at the center of the test pixel 1005 and stopping at the center of the south-eastern test pixel 1009. The other three test lines are similarly created. It can be appreciated by those of ordinary skill in the art that the lines 1010, 1011, 1012, etc. may comprise line segments extending between the centers of two adjoining pixels. For example, line 1010 comprises a line segment 1010A between the centers pixels 1001 and 1005 and 1010B between 1005 and 1009, and the same is true for 1011 and 1012.

The purpose of these test lines is to help determine whether the test pixel is within a locally smooth area; whether it should be joined to at least some of its neighbors to avoid rendering distracting gaps.

Figure 11:
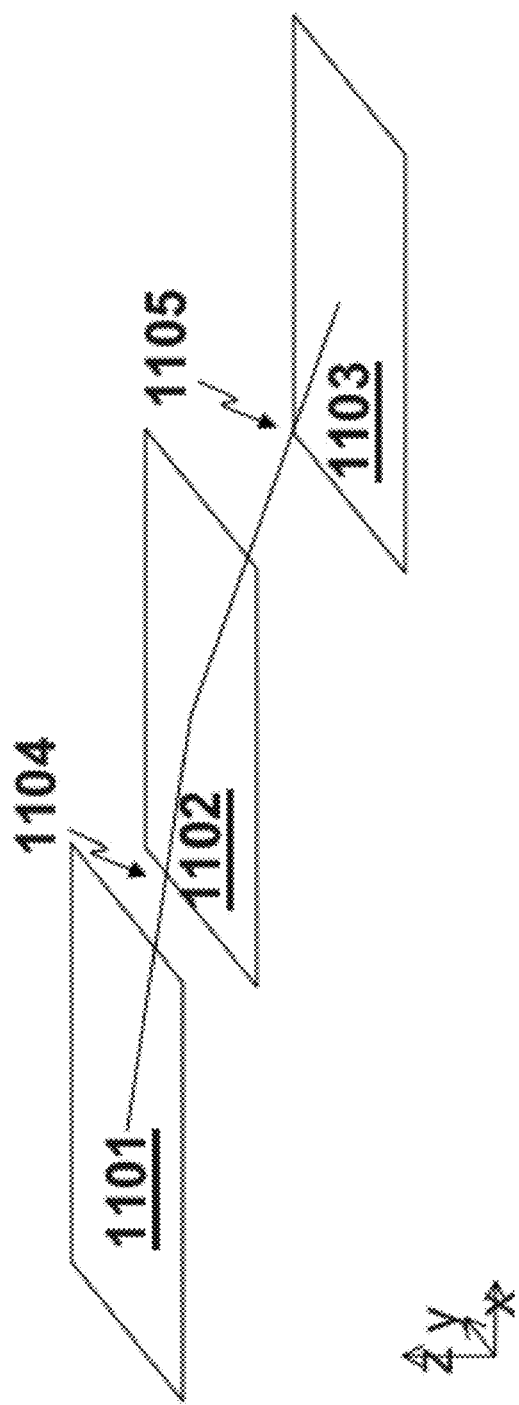
FIG. 11 shows test pixel with smooth test line.

FIG. 11 is an axonometric projection of a test pixel 1102 with a first neighbor pixel 1101 and a second neighbor pixel 1103. A test line has been drawn through the three pixels. Both the first half of the test line 1104 and the second half of the test line 1105 are depicted.

With texture-based segmentation, the slope ($m_1$) of the first half of the test line 1104 and the slope ($m_2$) of the second half of the test line 1105 are compared. If the two slopes are approximately equal, then the test line is marked as smooth. If they are not approximately equal, then the test line is marked as unsmooth. In some preferred embodiments of the invention, whether they are approximately equal or not is determined by checking to see whether $|m_1-m_2| \leq \Delta_{max}$, where $\Delta_{max}$ is a threshold of similarity. Depending upon the circumstances and subject matter, $\Delta_{max}$ can be set to an exact value, such as 0.3, it can be a value that is modifiable for each rendering, or it can even be modifiable for different test pixels or different test lines. If the units of measurement in the source data are not uniform, then the slope values or $\Delta_{max}$ may need to be adjusted accordingly.

Figure 12:
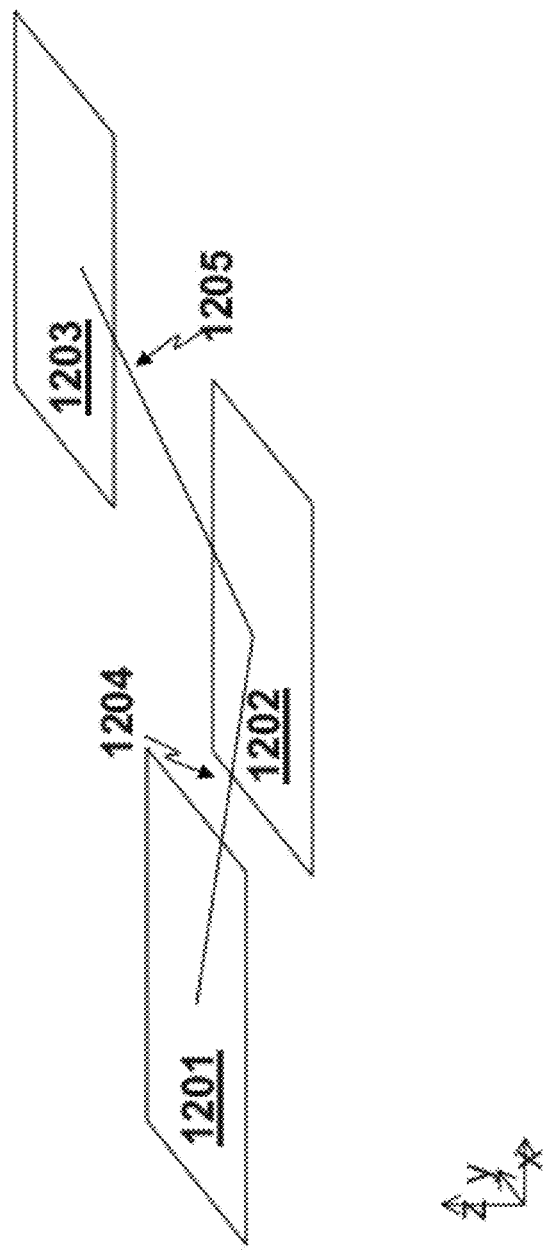
FIG. 12 shows test pixel with disjoint test line.

FIG. 12 shows another test pixel 1202, along with a first neighbor pixel 1201 and a second neighbor pixel 1203. Again, the first half of the test line 1204, and the second half of the test line 1205 are depicted. In this figure, both the first neighbor pixel 1201 and the second neighbor pixel 1203 are in planes above the test pixel 1202. This means that the slope, $m_1$, for the first half of the test line 1204 is negative while the slope, $m_2$, for the second half of the test line 1205 is positive. Unless $\Delta_{max}$ is set very high, $|m_1-m_2|$ will be greater than $\Delta_{max}$, so the test line would not be marked as "smooth." The terminology "smooth" as used herein relates to the comparisons of the lines between the centers of adjacent pixels, and two criteria: (1) SLOPES ARE SIMILAR and (2) SOPES NOT BE EXCESSIVE, then the test line(s) is determined to be "smooth." Similarly, other terminology such as "within predetermined parameters" or "acceptable" could be used without departing from the scope of the invention.

Figure 13:
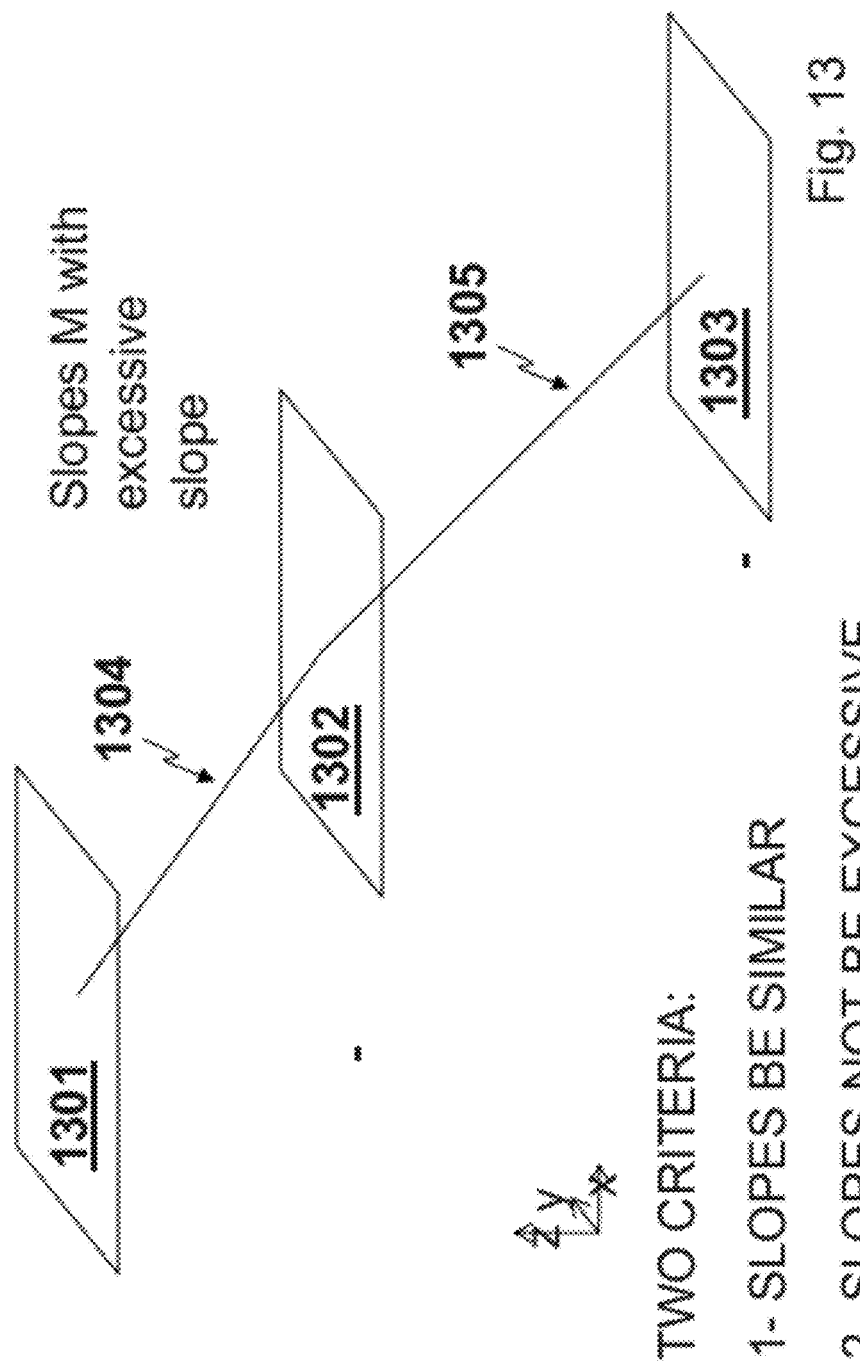
FIG. 13 shows test pixel with smooth, but excessively steep test line.

FIG. 13 depicts another scenario involving a test pixel 1302, along with a first neighbor pixel 1301 and a second neighbor pixel 1303. Again, the first half of the test line 1304, and the second half of the test line 1305 are depicted. This scenario illustrates a different constraint that can be used in texture-based segmentation.

Terrain data comprising elevations at different coordinates in the terrain often does not have detailed information about steep parts of the terrain. Depicting smooth surfaces along these steep sections can produce misleading visualizations. To avoid this problem, a maximum slope value ($m_{max}$) can be set. If either half of the test line has a slope that is steeper than $m_{max}$, then the line is not marked as smooth. The value for $m_{max}$ can be set to an exact value, such as 1.0, it can be a value that is modifiable for each rendering, or it can even be modifiable for different test pixels or different test lines. If the units of measurement in the source data are not uniform, then the slope values or $m_{max}$ may need to be adjusted accordingly.

In the scenario illustrated in FIG. 13, the slope ($m_1$) for the first half of the test line 1304 is −1.0. If $m_{max}$ is also 1.0, then $m_1$ would be considered level enough that the test line might be considered smooth. However, the slope ($m_2$) for the second half of the test line 1305 is less than −1.0. Thus, $m_2$ would be considered too steep and the test line would not be marked as smooth.

In some embodiments of the invention, the number of smooth lines drawn through a given test pixel indicate whether the test pixel is in a locally smooth area. In some embodiments of the invention, a smooth lines threshold value, θ, must be met for a pixel to be considered within a locally smooth area. θ can be set to an exact value, such as 3, it can be a value that is modifiable for each rendering, or it can even be modifiable for different test pixels. Different test lines can also contribute different weightings rather than simply contributing 1 to a smooth lines count.

Figure 14:
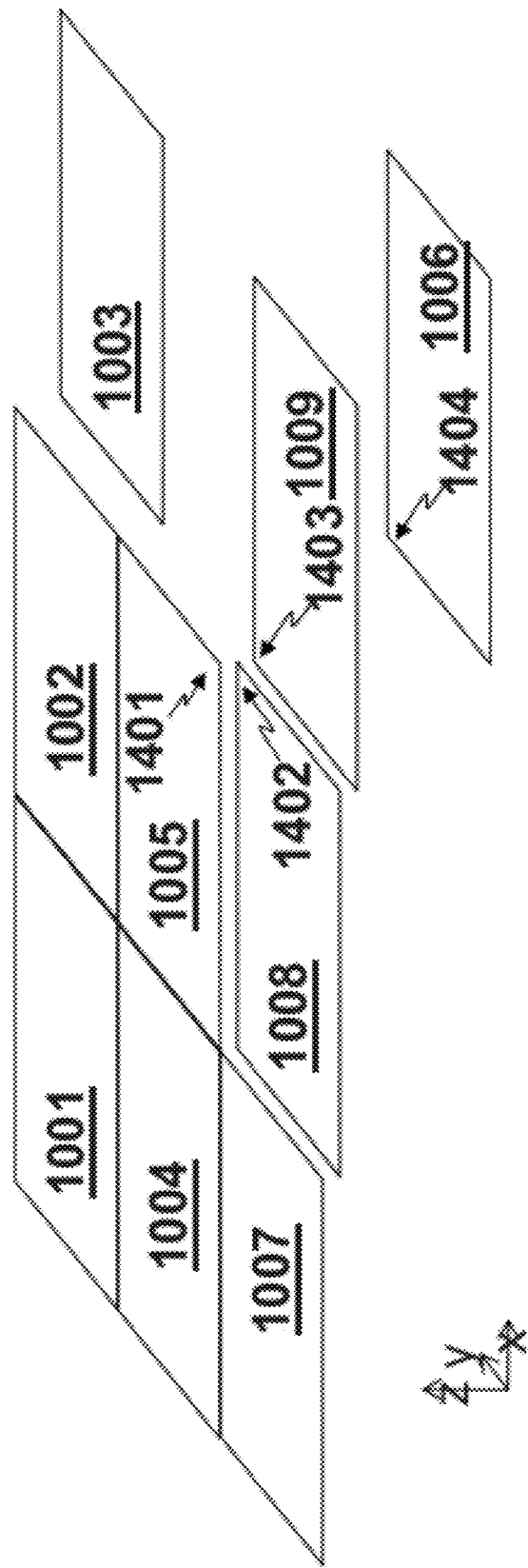
FIG. 14 shows test pixel before texture-based segmentation.

FIG. 14 is an axonometric projection of a test pixel 1005 and its neighbor pixels 1001-1004 and 1006-1009. Note that the overhead view would present contiguous pixels, but with the transition to a 3-D image, gaps appear that reflect differences in elevation. The test pixel 1005 is in a relatively smooth local area, so it is joinable with at least portions of the surrounding neighbor pixels 1001-1002, 1004 and 1007-1009. In some embodiments of the invention, only a single test vertex 1401 of the test pixel 1005 is treated as movable. In such embodiments, the rest of the test pixel 1005 vertices are fixed while the test pixel is being joined. In such embodiments, a southern movable vertex 1402, a southeastern movable vertex 1403, and an eastern movable vertex 1404 may also be identified as potentially movable vertices. In contrast, pixel 1006 is located at a substantially different elevation and is not joined with any of the other pixels shown in FIG. 15. Similarly, pixel 1003 is located at a substantially different elevation and is not joined with any of the other pixels shown in FIG. 15.

FIG. 15 depicts the test pixel 1005 and its neighbor pixels 1001-1004 and 1006-1009 after the test pixel 1005 has been joined with its neighbors. Here, only the test lines from the northwest-southeast, north-south, and northeast-southwest test lines contributed to the determination that the test pixel 1005 was in a locally smooth area. The slight difference in elevation at corners of test pixel 1005 with pixels 1008 & 1009 results in vertices 1401, 1402 & 1403 being joined. The west-east test line did not contribute to this determination. Because the west-east test line was not considered smooth, the eastern movable vertex 1404 (on pixel 1006) is fixed and otherwise ignored during the joining process. The remaining movable vertices, the test movable vertex 1401, the southern movable vertex 1402, and the southeastern movable vertex 1403, are averaged. This warps the test pixel 1005, the southern neighbor 1008, and the southeastern neighbor 1009. Note that there is a substantial difference in elevation between pixel 1006 and test pixel 1005.

The test line that ran through the northeastern neighbor 1003 did contribute to the determination that the test pixel 1005 was in a locally smooth area, but in some embodiments of the invention, it is not used in the process of joining the test pixel 1005 to its neighbor pixels 1001-1002 and 1007-1009.

Other embodiments of the invention may employ a different process for joining test pixels with neighbor pixels. For example, a weighted average may be used to identify the new location for the movable vertices, or the test pixel's movable vertex may actually be fixed while the other movable vertices are adjusted.

Figure 16:
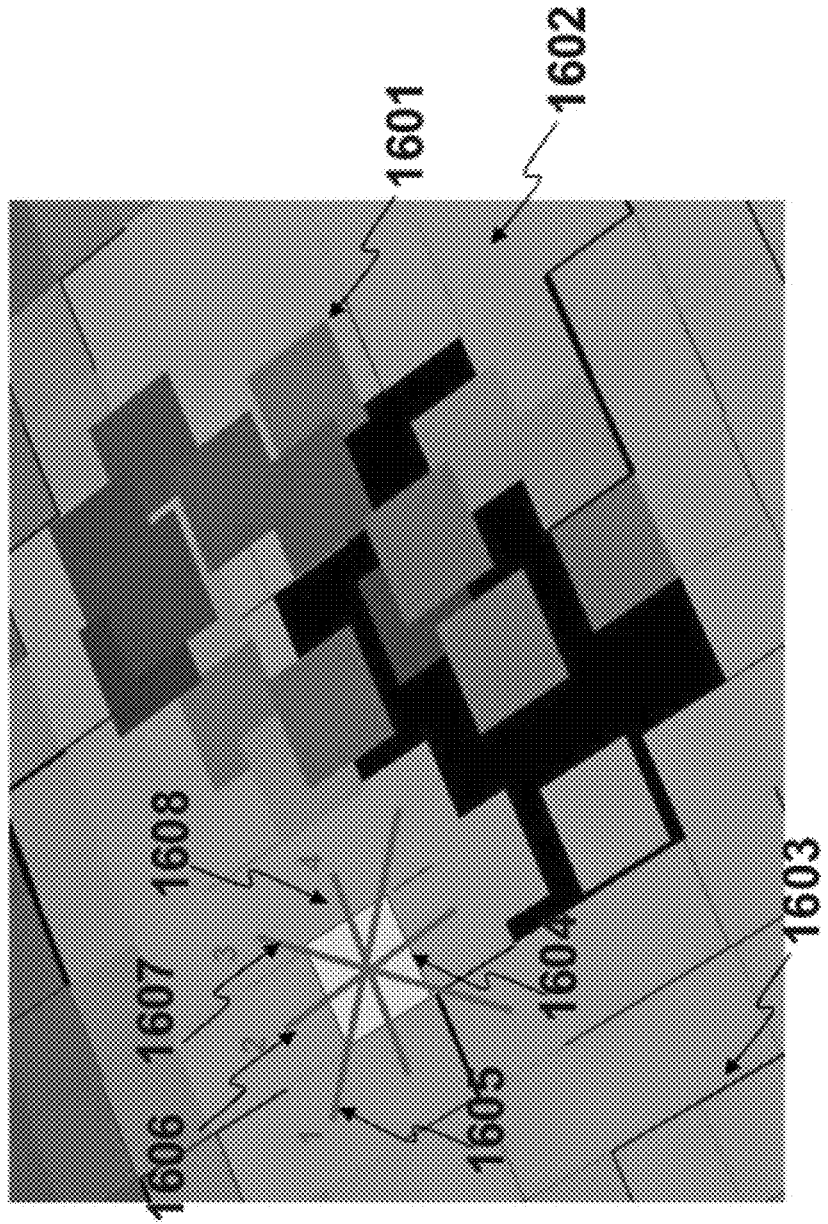
FIG. 16 shows close view of visualization before texture-based segmentation.

FIG. 16 shows a close-up rendering of a bush before texture-based segmentation has been applied. The pixels were created using an overhead view; resulting the pixels being disjointed and gaps appearing when the pixels are transitioned to a 3-D image. FIG. 16 shows pixels representing the bush 1601, pixels representing the ground (including pixel 1602), and the gaps created by a slightly uneven surface 1603. FIG. 16 depicts a test pixel 1604 with the test lines 1605-1608 used to determine whether the test pixel is locally smooth.

Figure 17:
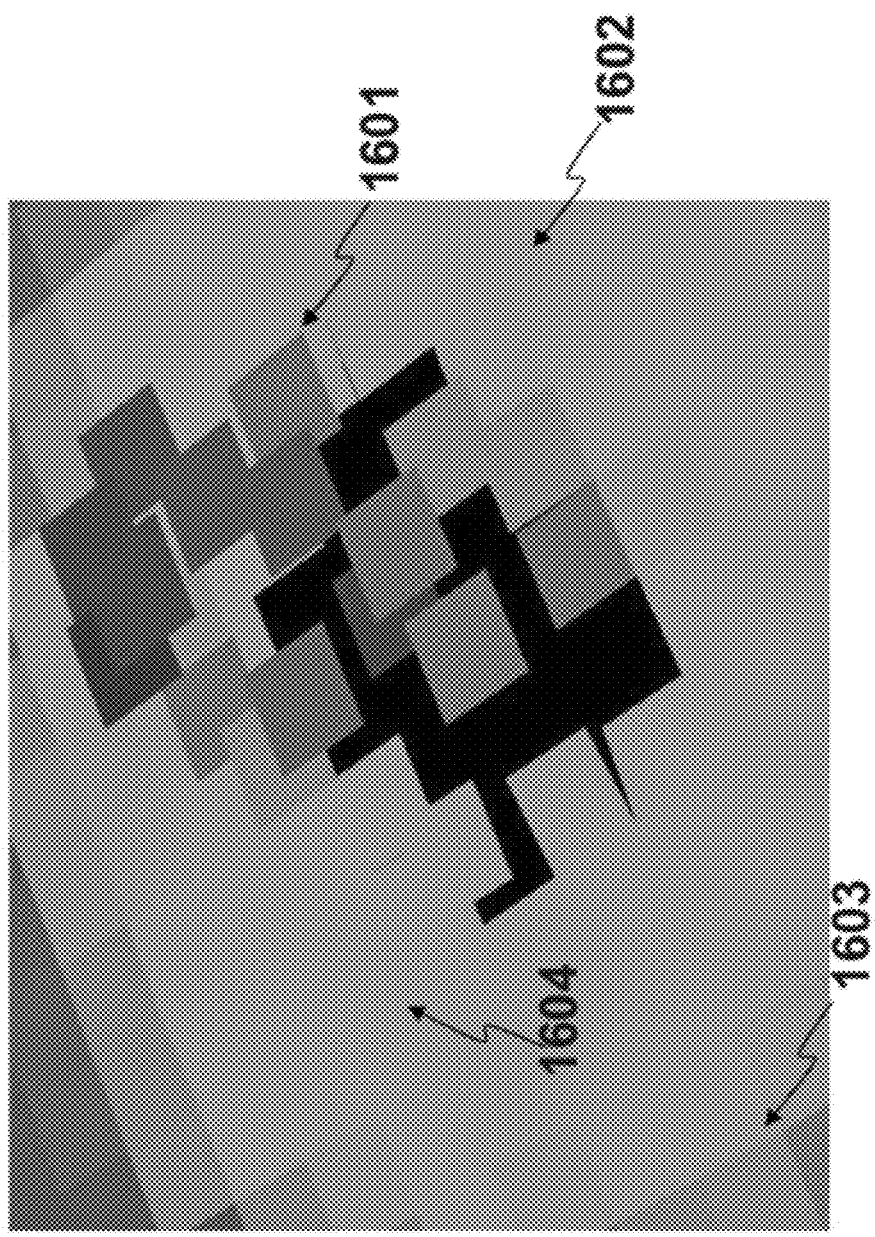
FIG. 17 shows close view of visualization after texture-based segmentation.

FIG. 17 shows a close-up rendering of the bush depicted in FIG. 16, but in FIG. 17 texture-based segmentation has been applied. This figure still shows pixels representing the bush 1601 and pixels representing the ground 1602. Many of the gaps in the surface have been eliminated 1603. The test pixel 1604 itself appears to be seamless with its neighbor pixels.

Figure 18:
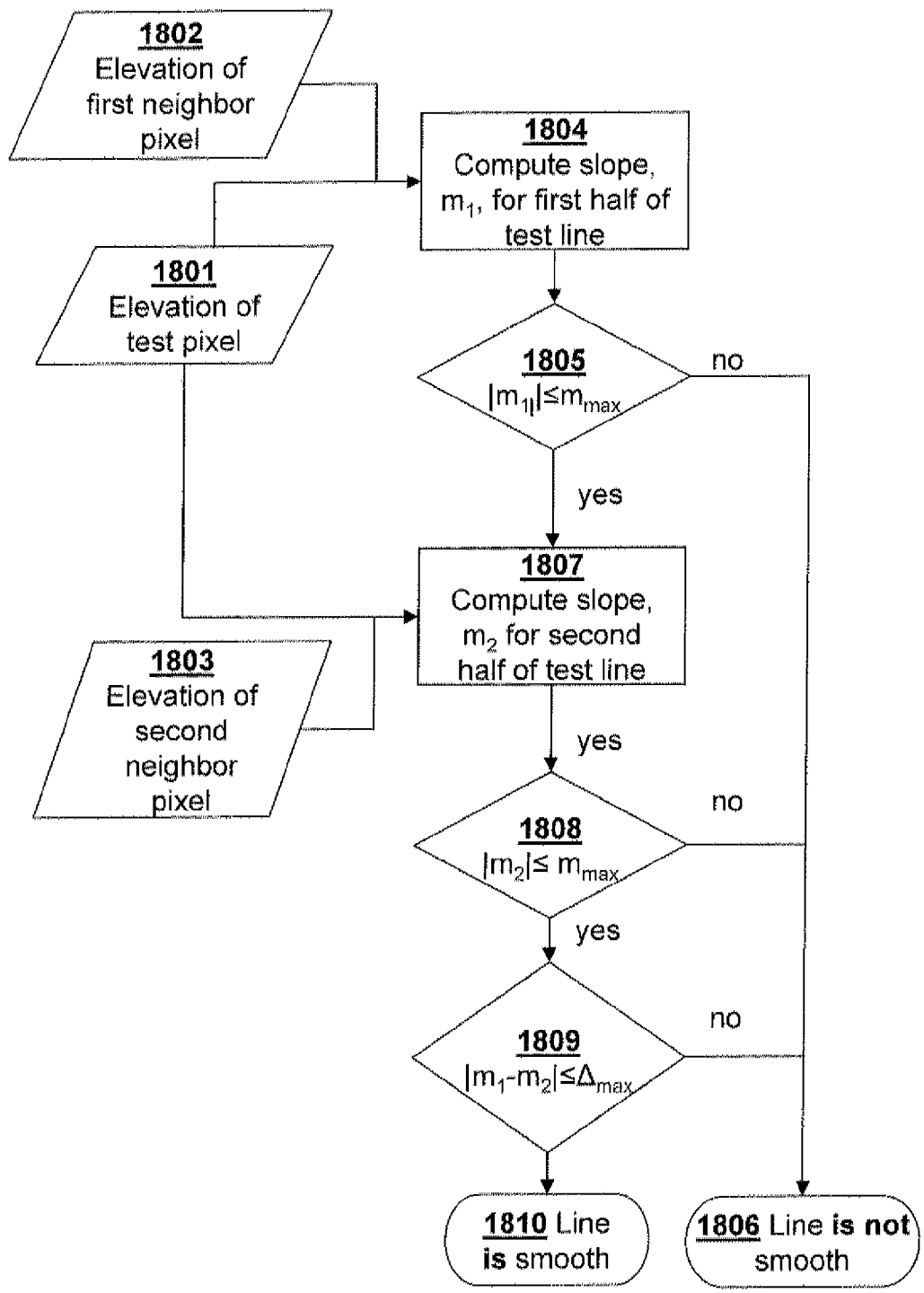
FIG. 18 shows a method of determining whether a test line is smooth.

FIG. 18 comprises a flow chart representing portions of some embodiments of the texture-based segmentation. FIG. 18 depicts a two criteria process for determining whether a test line is smooth. For this process, the elevation of the test pixel 1801, the elevation of the first neighbor pixel 1802, and the elevation of the second neighbor pixel 1803 are fed into computations 1804 and 1807 for the slope of the first half of a test line and for the slope of the second half of the test line, respectively. For both slopes, test steps 1805 and 1808 are performed to ensure that neither slope is too steep. If both slopes are determined to be level enough (i.e. less than or equal to $m_{max}$), then a test 1809 is executed to determine whether the slopes are sufficiently close to one another (i.e., $|m1-m2| \leq \Delta max$). If all tests are successful, then the line is considered "smooth" 1810, otherwise it is not considered to be "smooth" 1806.

Figure 19:
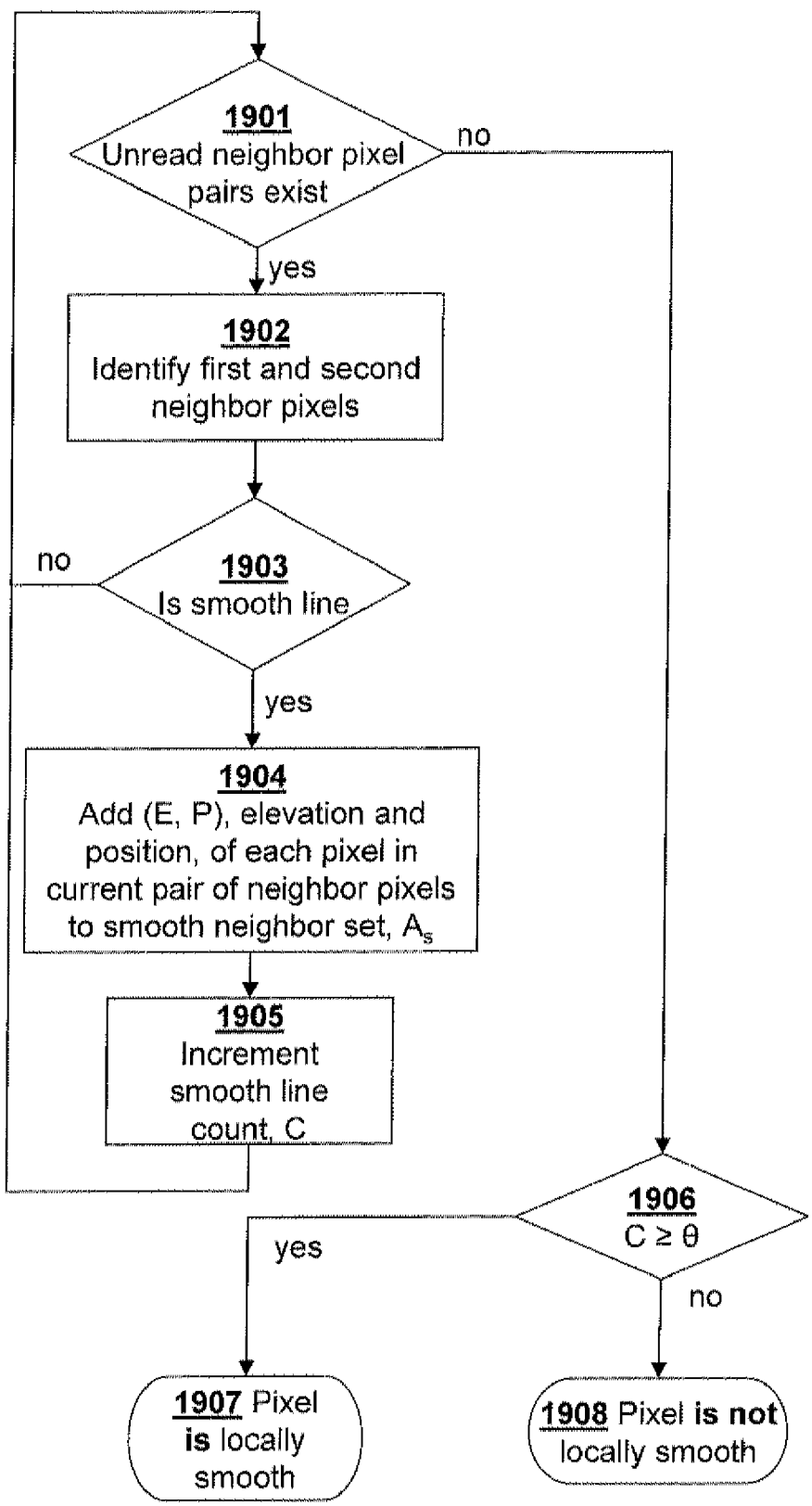
FIG. 19 shows a method of determining whether a pixel is locally smooth.

FIG. 19 is another flow chart representing a further subroutine in some preferred embodiments of the texture-based segmentation. FIG. 19, like FIG. 18, depicts a subroutine for determining whether a test pixel is locally smooth. This subroutine analyzes the neighbor pixel pairs: northwestern-southeastern, northern-southern, northeastern-southwestern, and western-eastern to determine whether or not an "unread" or unprocessed neighbor pixel pairs exist. While unread neighbor pixel pairs exist 1901, a first neighbor pixel and a second neighbor pixel are identified 1902 as the next unread neighbor pixel pair. Then the process depicted in FIG. 18 is used to determine whether the test line through these neighbor pixels and the test pixel is within the two criteria set forth in FIG. 18, i.e. smooth 1903. If so, the elevation E and position P of the neighbor pixels are added 1904 to a smooth neighbor set ($A_s$) and a smooth line count C is incremented 1905. This process is repeated for all of the neighbor pixel pairs. Once all of the pixel pairs have been examined, the smooth line count C is tested 1906 to ensure that it meets the local smooth area threshold θ. If it does, then the test pixel is treated as locally smooth 1907, otherwise the test pixel is not treated as locally smooth 1908.

Figure 20:
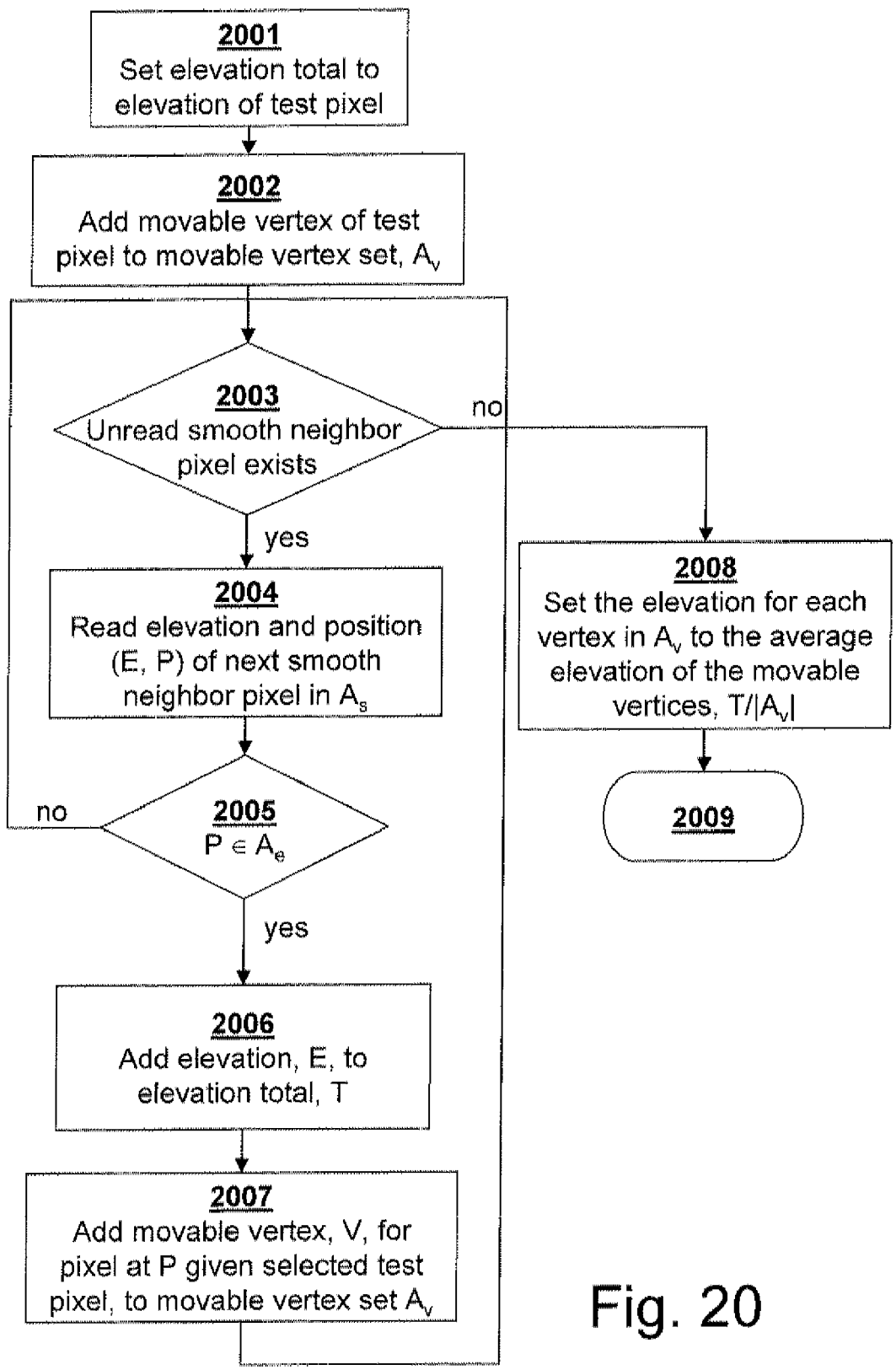
FIG. 20 shows a method of joining a locally smooth pixel to neighbor pixels.

FIG. 20 is another flow chart representing a subroutine in some embodiments of the texture-based segmentation. FIG. 20 depicts a process for joining a test pixel with its neighbor pixels. This process computes an average elevation 2008 based on the elevation of the test pixel 2001 and the elevations 2004 of the pixels with movable vertices 2005 that contributed to the determination that the test pixel was in a locally smooth area 2003 and 2006. In this depicted process, the movable vertex set ($A_v$) is concurrently built using the movable vertex in the test pixel 2002 and vertices in the pixels in smooth neighbor set ($A_s$) that are in the set of eligible movable vertices ($A_e$) 2007 before this process ends at 2009. For example, if the southeastern vertex is the movable vertex of the test pixel and $A_s$ consists of the northwestern, southeastern, northeastern, southwestern, western and eastern neighbor pixels, then $A_v$ will be built to include the southeastern vertex of the test pixel, the northwestern vertex of the southeastern neighbor pixel and the southwestern vertex of the eastern pixel. Similarly, with reference to FIG. 15, only the test lines from the northwest-southeast, north-south, and northeast-southwest test lines (as shown in FIG. 15) contributed to the determination that the test pixel 1005 was in a locally "smooth" area. The slight difference in elevation at corners of test pixel 1005 with pixels 1008 & 1009 resulted in vertices 1401, 1402 & 1403 being joined.

Figure 21:
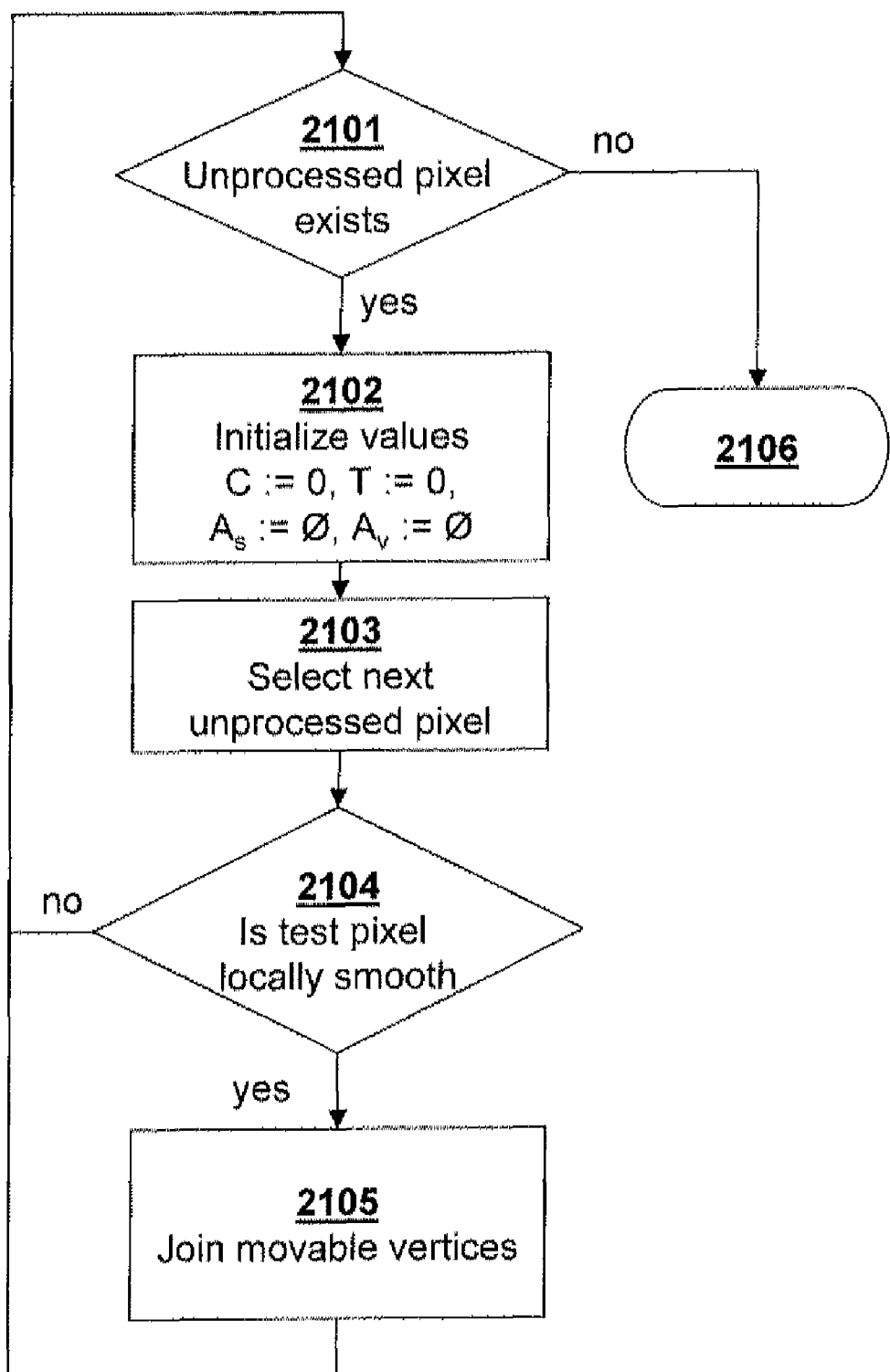
FIG. 21 shows a texture-based segmentation embodiment.

FIG. 21 is a flow chart that effectively brings together the subcomponents depicted in FIGS. 18-20 to show an embodiment of texture-based segmentation. In this process, a set of unprocessed pixels are processed beginning at diamond 2101. This set may be a complete terrain, or it may be some subset of the terrain. Key values are initialized 2102 before each test pixel is selected 2103. Each test pixel is tested 2104 to determine whether it is locally "smooth," the process depicted in FIG. 19, which relies on the process depicted in FIG. 18. If the test pixel is locally "smooth," then the test pixel is joined with its neighbors, the process depicted in FIG. 20. This continues until there are no more pixels to process 2106.

It should be apparent to one of ordinary skill in the art that implementation details can vary without departing from the teachings of the invention. Flags can be used instead of sets. Hard-coded steps can avoid use of certain sets. Tests for smoothness can include information from non-adjacent pixels. Pixels can be joined using moving averages. Optimizations can be introduced to reduce computation time. Default data values can be used where no data exists. Other implementation details can be varied without departing from the scope of the claimed invention.

Figure 22:
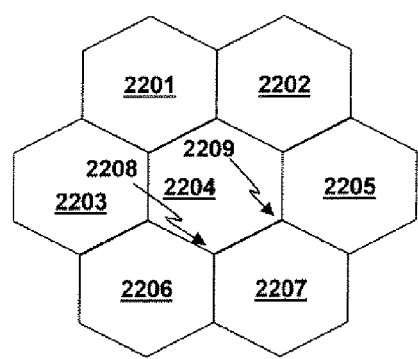
FIG. 22 shows an alternative to Cartesian pixels.

FIG. 22 illustrates that the pixels rendered do not have to be square or even depicted on a Cartesian coordinate system. In this figure, a test pixel 2204 is surrounded by six neighbor pixels, 2201-2203 and 2205-2007. Potential test lines can still be drawn through these pixels to determine whether the test pixel 2204 is locally smooth. For example, a test line can be drawn through a first neighbor pixel 2201, the test pixel 2204, and a second neighbor pixel 2207. Instead of only moving one test vertex, multiple test vertices 2208 and 2209 can be moved to close gaps.

Figure 23:
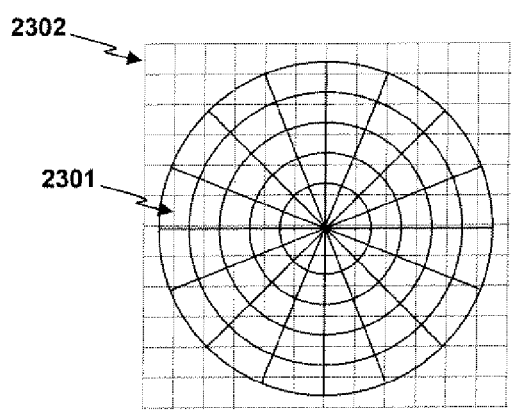
FIG. 23 shows another approach to handling non-Cartesian pixels.

FIG. 23 shows an alternative approach to handling data provided in a non-Cartesian coordinate system. In this figure, the original pixels are mapped on a polar coordinate system 2301. One method of processing these pixels is to overlay a Cartesian coordinate system 2302 over the polar coordinate system 2301, and compute pixel elevation values based on a weighted average of the pixels underneath each point in the Cartesian coordinate system 2302.

The terminology "planar image" as used in the following claims means an aerial photograph, satellite photograph, or a still photograph taken from ground level.

It should be emphasized that the above-described embodiments are merely possible examples of implementations. Many variations and modifications may be made to the above-described embodiments. All such modifications and variations are intended to be included herein within the scope of the disclosure and protected by the following claims. The term "processor" or "computer" as used herein includes multiprocessors, computers, supercomputers, data processor, laptops, signal processors, personal computers, notebook computers, and/or any component which processes data. The term "image generator" as used herein includes a "MEMS" device or array which generate images and/or any element or component, including components within the MEMS structure, which generate images which may be used as a screen or monitor. The abbreviation RF or rf is used for radio frequency or a radio frequency signal. The term "subject" as used herein means a person, human or animal.

Appendix—Example Partial Code Listings C++
(Two Different)

FIRST LISTING- "WARPED SMOOTH RECTANGLES"

```
//
//****************************************************************
//********
// Smooth surface where flags indicate
//
//****************************************************************
//********
int map3d_manager_inv_class::mod_image_coords(float *data_elev, unsigned char
*flags, int nx_read,    int ny_read,
                        int ix1, int ix2, int iy1, int iy2)
{
    // Index thru last-hit surface -- outer loop top to bottom, inner loop left to right
    // For each pixel, mod lower-right coord of test pixel using pixels to right,
    //   lower and lower-right
    int ix, iy, navg, ip, ipu, ipr, ipur, ift, ifr, ifu, ifur, ifyminok, ifymaxok, ifxminok,
ifxmaxok;
    int nx, ic, icu, icr, icur, ixstart, ixstop, iystart, iystop;
    float range, range_sum, ranget;
    nx = ix2 - ix1;
    //
//****************************************************************
//********
    // Logic to eliminate seams at edges of page, but watch out not to slop over image
boundary
    //
//****************************************************************
//********
        iystart = iy1-1;
        if (iystart < 0) iystart = 0;
        iystop = iy2;
        if (iystop >=ny_read) iystop = ny_read-1;
        ixstart = ix1-1;
        if (ixstart < 0) ixstart = 0;
        ixstop = ix2;
        if (ixstop >=nx_read ) ixstop = nx_read-1;
        //
```

FIRST LISTING- "WARPED SMOOTH RECTANGLES"

```
****************************************************************************
*********
        // For each pixel, look at upper-right corner vertex -- avg with adjacent pixels is smooth
        //
****************************************************************************
*********
        for (iy=iystart; iy<iystop; iy++) {
            ifyminok = 1;
            if (iy < iy1) ifyminok = 0;
            ifymaxok = 1;
            if (iy >= iy2-1) ifymaxok = 0;
            for (ix=ixstart; ix<ixstop; ix++) {
                ifxminok = 1;
                if (ix < ix1) ifxminok = 0;
                ifxmaxok = 1;
                if (ix >= ix2-1) ifxmaxok = 0;
                ic = (iy - iy1) * nx + (ix - ix1);          // Index into tile
                    ip = (ny_read-iy-1) * nx_read + ix;      // Index into read block
                    if (flags[ip]) {
                        navg = 0;
                        ift = 0;
                        ifr = 0;
                        ifu = 0;
                        ifur = 0;
                        range_sum = 0.;
                        if (flags[ip] & 1) {
                            range = data_elev[ip] - ref_utm_elevation;
                            range_sum = range_sum + range;
                            ift = 1;
                            navg++;
                        }
                        ipr = ip + 1;
                        if (flags[ip] & 2) {
                            ranget = data_elev[ipr] - ref_utm_elevation;
                            range_sum = range_sum + ranget;
                            ifr = 1;
                            navg++;
                        }
                        ipu = ip - nx_read;
                        if (flags[ip] & 8) {
                            ranget = data_elev[ipu] - ref_utm_elevation;
                            range_sum = range_sum + ranget;
                            ifu = 1;
                            navg++;
                        }
                        ipur = ip - nx_read + 1;
                        if (flags[ip] & 4) {
                            ranget = data_elev[ipur] - ref_utm_elevation;
                            range_sum = range_sum + ranget;
                            ifur = 1;
                            navg++;
                        }
                        range = range_sum / navg;
                        if (ift && ifxminok && ifyminok) {
                                coords_last[4*ic +2][2] = range;
                        }
                        if (ifr && ifxmaxok && ifyminok) {
                                icr = ic + 1;
                                coords_last[4*icr +3][2] = range;
                        }
                        if (ifu && ifxminok && ifymaxok) {
                                icu = ic + nx;
                                coords_last[4*icu +1][2] = range;
                        }
                        if (ifur && ifxmaxok && ifymaxok) {
                                icur = ic + nx + 1;
                                coords_last[4*icur ][2] = range;
                        }
                    }
            }
        }
        return(1);
}
```

SECOND LISTING - "FLAG SMOOTH PIXELS CODE FRAGMENT"

```
//
//*****************************************************************
// For each pixel, make flags indicating smoothness -- Private
//
//*****************************************************************
int map3d_index_class::make_smooth_flags( )
{
    int ih, iw, i_nebor, ip, i;
    float elev_test, elevt, d1, d2;
    int* pnebor = new int[8];
    float* elev_nebor = new float[8];          // Range of nearest peak for each nebor
    int line_flag[4];
    int line_count, n_mark_smooth = 0;
    int th_n_lines = 3;                        // Hardwired -- dsmoothing parm
    float th_line_drange = 0.3;                // Hardwired -- dsmoothing parm
    float th_slope = 1.0; // Hardwired -- dsmoothing parm
    memset(smooth_flags, 0, sizeof(unsigned char)*roi_np);
    for (ih = 1; ih < roi_ny-1; ih++) {
        for (iw = 1; iw < roi_nx-1; iw++) {
            ip = ih * roi_nx + iw;
            elev_test = data_a2[ip];           // Test peak
            //
//*****************************************************************
            // Indices for 3x3 neighbors - Around circle cw from top left
            //
//*****************************************************************
            pnebor[0] = (ih + 1) * roi_nx + iw - 1;
            pnebor[1] = (ih + 1) * roi_nx + iw    ;
            pnebor[2] = (ih + 1) * roi_nx + iw + 1;
            pnebor[7] = (ih    ) * roi_nx + iw - 1;
            pnebor[3] = (ih    ) * roi_nx + iw + 1;
            pnebor[6] = (ih - 1) * roi_nx + iw - 1;
            pnebor[5] = (ih - 1) * roi_nx + iw    ;
            pnebor[4] = (ih - 1) * roi_nx + iw + 1;
            //
//*****************************************************************
            // For each neighbor,
            //
//*****************************************************************
            for (i_nebor=0; i_nebor<8; i_nebor++) {
                elevt = data_a2[pnebor[i_nebor]];
                elev_nebor[i_nebor] = elevt;
            }
            //
//*****************************************************************
            // For each neighbor,
            //
//*****************************************************************
            line_count = 0;
            for (i=0; i<4; i++) {
                line_flag[i] = 0;
                d1 = elev_nebor[i] - elev_test;
                d2 = elev_test - elev_nebor[i + 4];
                if (fabs(d1-d2) < th_line_drange && fabs(d1) < th_slope) {
                    line_count++;
                    line_flag[i] = 1;
                }
            }
            if (line_count < th_n_lines) continue;
                if (line_flag[0]) {            // ll to ur diagonal
                    smooth_flags[ip]        = smooth_flags[ip]        | 5;
                    smooth_flags[pnebor[0]] = smooth_flags[pnebor[0]] | 5;
                }
                if (line_flag[1]) {            // vertical
                    smooth_flags[ip]        = smooth_flags[ip]        | 9;
                    smooth_flags[pnebor[0]] = smooth_flags[pnebor[0]] | 6;
                    smooth_flags[pnebor[1]] = smooth_flags[pnebor[1]] | 9;
                    smooth_flags[pnebor[7]] = smooth_flags[pnebor[7]] | 6;
                }
                if (line_flag[2]) {            // ul to lr diagonal
```

SECOND LISTING - "FLAG SMOOTH PIXELS CODE FRAGMENT"

```
            smooth_flags[pnebor[1]] = smooth_flags[pnebor[1]] | 10;
            smooth_flags[pnebor[7]] = smooth_flags[pnebor[7]] | 10;
          }
          if (line|flag[3]) {        // horizontal
            smooth_flags[ip]       = smooth_flags[ip]       | 3;
            smooth_flags[pnebor[0]] = smooth_flags[pnebor[0]] | 12;
            smooth_flags[pnebor[1]] = smooth_flags[pnebor[1]] | 12;
            smooth_flags[pnebor[7]] = smooth_flags[pnebor[7]] | 3;
          }
      } // For loop over width
  } // For loop over height
  for (ip=0; ip<roi_ny*roi_nx; ip++) {
      if (smooth_flags[ip]) n_mark_smooth++;
  }
  if (diag_flag > 1) cout << "Calculate smooth, N marks " << n_mark_smooth << endl;
  return(1);
}
```

The invention claimed is:

1. A method of visualizing a three-dimensional image formed from rasterized elevation data comprising:
inputting a series of pixels comprising elevation values to form an image;
the image comprising rough areas and smooth areas; a rough area being where there are large differences between elevation values of neighboring pixels or varying differences in elevation values; a smooth area being where elevation differences are relatively small and approximate a smooth surface;
comparing each pixel in the series of pixels to the neighboring pixels within a neighborhood of at least 3 pixels by 3 pixels;
categorizing pixels as being either in rough or smooth areas depending upon differences in between elevation values of neighboring pixels;
determining a pixel to be in a smooth area if the elevation values in a neighborhood of the pixel are approximately planar and the resulting plane is in the range of approximately 0 to 63 degrees from the horizontal;
categorizing a pixel to be in a rough area if it does not meet the criteria for a smooth-area pixel;
depicting pixels in the rough areas with a discrete marker at the corresponding elevation;
depicting pixels in the smooth areas by constructing a continuous surface that passes through or very near the corresponding elevation values, and displaying the modified series of pixels, wherein, at least some of these steps are implemented on a computational device.

2. The method of claim 1 wherein the pixels in rough areas are depicted with horizontal rectangles the size of the pixel such that when the three dimensional image is viewed from directly above, the image presents contiguous pixels, but when the viewpoint is shifted toward the horizon gaps appear that reflect differences in elevation;
whereby the visual artifacts are minimized at the boundaries between smooth and rough areas and at locations where there are errors in the categorizing of the pixels.

3. The method of claim 1 wherein the pixels in rough areas are depicted with horizontal rectangles the size of the pixel so that for a perfectly horizontal surface the rectangle markers precisely tile the area and form a continuous surface; the use of these rectangles minimizes the visual artifacts caused by errors in the categorizing of the pixels; and wherein the three dimensional image can be viewed from different perspectives such that when looking at the overhead view, the image presents contiguous pixels, but when viewed from a side view, with the transition to a 3-D image, gaps appear that reflect differences in elevation.

4. The method of claim 1 wherein the pixels are defined by horizontal polygonal surfaces and wherein the three dimensional image can be visualized from different viewpoints including
an overhead view when the image is presented as contiguous pixels with no gaps therebetween; and
a three-dimensional side view where the pixels in the rough areas have gaps therebetween reflecting differences in elevation, and the pixels in the smooth areas are joined both horizontally and vertically to create a continuous surface.

5. A method of converting a planar image into a three-dimensional image comprising the following steps:
inputting planar image data as a series of pixels,
identifying a test pixel within the series of pixels,
identifying a set of neighbor pixels in proximity to the test pixel, ascertaining whether the test pixel is locally smooth in relationship to the set of neighbor pixels comprising:
clearing a cumulative value,
identifying a first neighbor pixel and a second neighbor pixel from the set of neighbor pixels, the first and second neighbor pixels being on opposite sides of the test pixel,
ascertaining whether the test pixel is smooth relative to the first neighbor pixel and the second neighbor pixel,
adding a score to the cumulative value if the test pixel is smooth relative to the first and second neighbor pixel and identifying the test pixel as relatively smooth if the cumulative value meets a minimum threshold value,
joining the test pixel to the set of neighbor pixels if the test pixel is locally smooth in relationship to the set of neighbor pixels and displaying the modified series of pixels,
wherein, at least some of these steps are implemented on a computational device.

6. The method of claim 5 wherein the minimum threshold value is 1.

7. The method of claim 5 wherein the minimum threshold value is 3.

8. The method of claim 5 wherein the process of ascertaining whether the test pixel is smooth relative to the first neighbor pixel and the second neighbor pixel comprises the following steps:
drawing a first line from the first neighbor pixel to the test pixel,
drawing a second line from the test pixel to the second neighbor pixel, computing a first slope of the first line,
computing a second slope of the second line,
identifying the test pixel as smooth relative to the first neighbor pixel and the second neighbor pixel if the absolute value of the first slope is less than or equal to a first maximum slope value, if the absolute value of the second slope is less than a second maximum slope value and if the absolute difference between the first slope and the second slope are less than or equal to a maximum slope delta value.

9. The method of claim 8 wherein the method is loaded onto a computer-readable medium having computer-readable program code that enables a computational device to implement the method.

10. The method of claim 8 wherein the first maximum slope value is 1 and the second maximum slope value is 1.

11. The method of claim 8 wherein the maximum slope delta value is near 0.3.

12. A method of converting a planar image into a three-dimensional image comprising the following steps:
inputting planar image data as a series of pixels,
identifying a test pixel within the series of pixels,
identifying a set of neighbor pixels in proximity to the test pixel,
ascertaining whether the test pixel is locally smooth in relationship to the set of neighbor pixels,
joining the test pixel to the set of neighbor pixels if the test pixel is locally smooth in relationship to the set of neighbor pixels including
selecting a test vertex in the test pixel,
selecting a neighbor pixel from the set of neighbor pixels,
selecting an adjacent movable vertex from the neighbor pixel,
warping the neighbor test pixel by moving the adjacent movable vertex to a position shared with the test vertex, and
displaying the modified series of pixels,
wherein, at least some of these steps are implemented on a computational device.

13. The method of claim 12 wherein the method is contained on a computer-readable medium having computer-readable program code that enables a computational device to implement the method of claim 12.

14. The method of claim 12 wherein the position shared with the test vertex is calculated using values comprising the position of the test vertex and the position of the adjacent movable vertex.

15. A method of converting a planar image into a three-dimensional image comprising the following steps:
inputting planar image data as a series of pixels,
identifying a test pixel within the series of pixels,
identifying a set of neighbor pixels in proximity to the test pixel,
ascertaining whether the test pixel is locally smooth in relationship to the set of neighbor pixels,
joining the test pixel to the set of neighbor pixels if the test pixel is locally smooth in relationship to the set of neighbor pixels and displaying the modified series of pixels including:
identifying an elevation value for the test pixel,
identifying an intensity value for the test pixel,
setting the color of the pixel to a value derived from the elevation value and the intensity value,
wherein, at least some of these steps are implemented on a computational device.

16. The method of claim 15 wherein the method is contained on a non-transitory computer-readable medium having computer-readable program code that enables a computational device to implement the method of claim 15.

17. A method of converting a planar image into a three-dimensional image for visualization of rasterized image data comprising the following steps:
inputting planar image data as a series of pixels,
identifying a test pixel within the series of pixels,
identifying a set of neighbor pixels in proximity to the test pixel,
ascertaining whether the test pixel is locally smooth in relationship to the set of neighbor pixels,
Joining the test pixel to the set of neighbor pixels if the test pixel is locally smooth in relationship to the set of neighbor pixels,
displaying the modified series of pixels,
reading a second layer of terrain data as a second series of pixels, identifying a second test pixel within the second series of pixels, making the second test pixel non-opaque, and displaying the second series of pixels,
wherein, at least some of these steps are implemented on a computational device.

18. A method of converting planar pixel data into three-dimensional imagery comprising:
inputting a planar image into a computational device as a series of pixels,
for each of a plurality of pixels, identifying a test pixel at the center of a block of nine pixels,
determining the interrelationships between the test pixel and each of the eight adjacent pixels by drawing line segments from the center of each neighboring pixel to the test pixel;
combining the line segments into four lines by combining opposing lines at the center of the test pixel;
determining whether the slopes of the two halves of each line are within a predetermined range comprising the steps of:
determining whether or not the slopes are less than or equal to a threshold value;
determining whether or not the difference between the slopes is equal to or less than a predetermined value;
if the slopes of the two halves of a line are both less than or equal to a first predetermined value and the difference between the slopes is less than or equal to a second predetermined value for at least a predetermined threshold percentage of the four lines, then joining at least a portion of the test pixel with the corresponding neighbor pixels attributable to the lines that meet the criteria, otherwise no joining takes place with this set of pixels;
whereby the process is repeated for each relevant pixel group and a 3-D image is generated from a planar image.

19. The method of claim 18 wherein process of joining the test pixel to the set of neighbor pixels comprising the following steps:
selecting a test vertex in the test pixel,
selecting a neighbor pixel from the set of neighbor pixels,
selecting an adjacent movable vertex from the neighbor pixel which meets the criteria, and
warping the neighbor test pixel by adjusting the elevation of the adjacent movable vertex to a position shared with the test vertex.

* * * * *